US012563627B2

(12) United States Patent
Madhurapantula et al.

(10) Patent No.: US 12,563,627 B2
(45) Date of Patent: Feb. 24, 2026

(54) METHOD AND APPARATUS FOR HANDLING USER PLANE IN WIRELESS COMMUNICATION SYSTEM SUPPORTING MR-MC

(71) Applicant: SAMSUNG ELECTRONICS CO., LTD., Suwon-si (KR)

(72) Inventors: Shweta Madhurapantula, Karnataka (IN); Neha Sharma, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 414 days.

(21) Appl. No.: 18/108,201

(22) Filed: Feb. 10, 2023

(65) Prior Publication Data

US 2023/0262823 A1 Aug. 17, 2023

Related U.S. Application Data

(63) Continuation of application No. PCT/KR2023/001847, filed on Feb. 8, 2023.

(30) Foreign Application Priority Data

Feb. 11, 2022 (IN) .............................. 202241007371
Nov. 29, 2022 (IN) .............................. 202241007371

(51) Int. Cl.
*H04W 76/20* (2018.01)
*H04W 76/30* (2018.01)
*H04W 88/06* (2009.01)

(52) U.S. Cl.
CPC ........... *H04W 76/20* (2018.02); *H04W 76/30* (2018.02); *H04W 88/06* (2013.01)

(58) Field of Classification Search
CPC ...... H04W 76/20; H04W 76/30; H04W 88/06
See application file for complete search history.

(56) References Cited

U.S. PATENT DOCUMENTS 11,765,555 B1 * 9/2023 Babaei .................. H04W 80/04
370/312
2010/0056147 A1 3/2010 Sun et al.
(Continued)

FOREIGN PATENT DOCUMENTS

KR 10-2016-0040472 4/2016
WO WO-2019064114 A1 * 4/2019 ............ H04W 76/25
(Continued)

OTHER PUBLICATIONS

Indian Office Action issued Mar. 4, 2024 in corresponding Indian Patent Application No. 202241007371.
(Continued)

*Primary Examiner* — Kevin T Bates
*Assistant Examiner* — Jaeyoung Kwak
(74) *Attorney, Agent, or Firm* — NIXON & VANDERHYE P.C.

(57) ABSTRACT

Embodiments herein provide a method and apparatus for handling bearer type change and user plane in a wireless communication supporting multi radio multi connectivity (MR-MC). A new bearer type is introduced to benefit from the increased radio resources of an additional network node. There is a method added to handle bearer type change that is applicable to both existing bearer types and new bearer type. The method includes suspending and resuming the bearer configuration at all layers, defining actions that take place at each layer during the bearer type change. With this mechanism, signaling overhead and latency is bearer establishment is reduced.

19 Claims, 12 Drawing Sheets

(56)    References Cited

U.S. PATENT DOCUMENTS

| | | | | |
|---|---|---|---|---|
| 2010/0074182 A1 | 3/2010 | Shao | | |
| 2016/0088542 A1 | 3/2016 | Belghoul et al. | | |
| 2016/0157164 A1 | 6/2016 | Lee et al. | | |
| 2017/0353992 A1 | 12/2017 | Quan et al. | | |
| 2019/0215717 A1* | 7/2019 | Lee | ........................ | H04W 72/21 |
| 2020/0245393 A1 | 7/2020 | Teyeb et al. | | |
| 2020/0351972 A1 | 11/2020 | Stattin et al. | | |
| 2021/0059000 A1 | 2/2021 | Ma | | |
| 2023/0189380 A1* | 6/2023 | Palat | ..................... | H04W 76/11 |
| | | | | 370/329 |
| 2024/0334515 A1* | 10/2024 | Xu | ........................ | H04W 76/15 |
| 2025/0071654 A1* | 2/2025 | Ericson | ............. | H04W 28/0278 |

FOREIGN PATENT DOCUMENTS

| | | | | |
|---|---|---|---|---|
| WO | 2020/151735 | 7/2020 | | |
| WO | 2020/019821 | 1/2022 | | |
| WO | WO-2022031214 A1 * | 2/2022 | ............ | H04W 76/16 |
| WO | WO-2023011806 A1 * | 2/2023 | ........ | H04W 56/0005 |

OTHER PUBLICATIONS

ETSI, "Universal Mobile Telecommunications System (UMTS); LTE; 5G; NR; Multi-connectivity; Overall description; Stage-2", 3GPP TS 37.340 version 16.5.0 Release 16, Apr. 30, 2021, 86 pages.

Extended European Search Report dated Dec. 23, 2024 issued in European Patent Application No. 23753149.6.

3GPP TSG-RAN, "Technical Specification Group Radio Access NetworkNetwork; Evolved Universal Terrestrial Radio Access (E-UTRA) and NR; Multi-connectivity", Meeting Notes, Stage 2; Release 16, Dec. 2021, 89 pages.

Search Report and Written Opinion dated May 15, 2023 issued in International Patent Application No. PCT/KR2023/001847.

Extended European Search Report dated Oct. 2, 2024 issued in European Patent Application No. 23753149.6.

Ericsson, 3GPP TSG-RAN WG2, "Configuring or resuming MR-DC in RRC Resume", Meeting Notes, Meeting #105bis, Apr. 8-12, 2019, 4 pages.

Samsung, 3GPP TSG-RAN, "Multi-RAT Multi-Connectivity (MR-MC) for 5G Advanced", Meeting Notes, Meeting #93-e, Sep. 13-17, 2021, 5 pages.

* cited by examiner

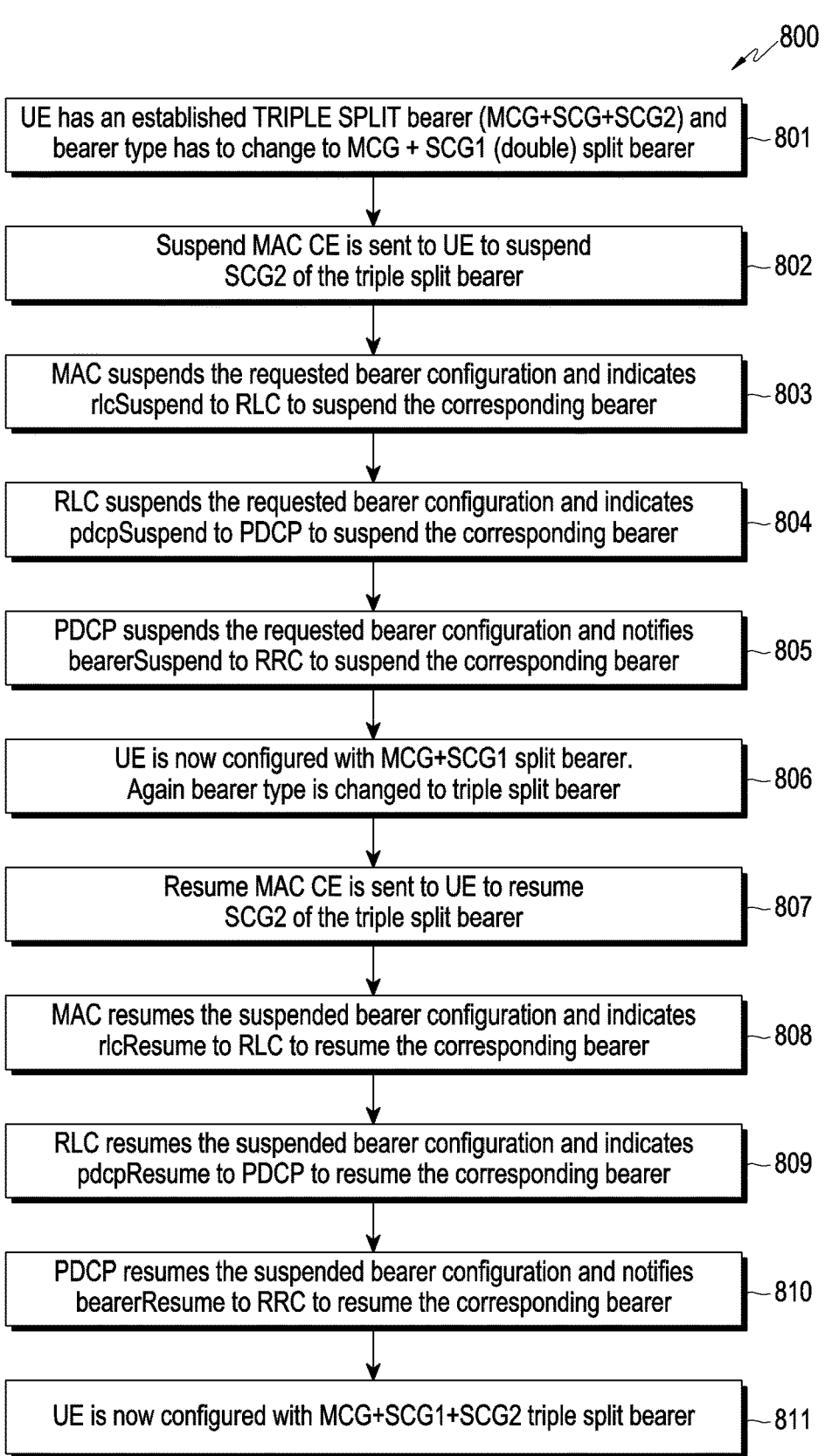

800

UE has an established TRIPLE SPLIT bearer (MCG+SCG+SCG2) and bearer type has to change to MCG + SCG1 (double) split bearer ~801

Suspend MAC CE is sent to UE to suspend SCG2 of the triple split bearer ~802

MAC suspends the requested bearer configuration and indicates rlcSuspend to RLC to suspend the corresponding bearer ~803

RLC suspends the requested bearer configuration and indicates pdcpSuspend to PDCP to suspend the corresponding bearer ~804

PDCP suspends the requested bearer configuration and notifies bearerSuspend to RRC to suspend the corresponding bearer ~805

UE is now configured with MCG+SCG1 split bearer. Again bearer type is changed to triple split bearer ~806

Resume MAC CE is sent to UE to resume SCG2 of the triple split bearer ~807

MAC resumes the suspended bearer configuration and indicates rlcResume to RLC to resume the corresponding bearer ~808

RLC resumes the suspended bearer configuration and indicates pdcpResume to PDCP to resume the corresponding bearer ~809

PDCP resumes the suspended bearer configuration and notifies bearerResume to RRC to resume the corresponding bearer ~810

UE is now configured with MCG+SCG1+SCG2 triple split bearer ~811

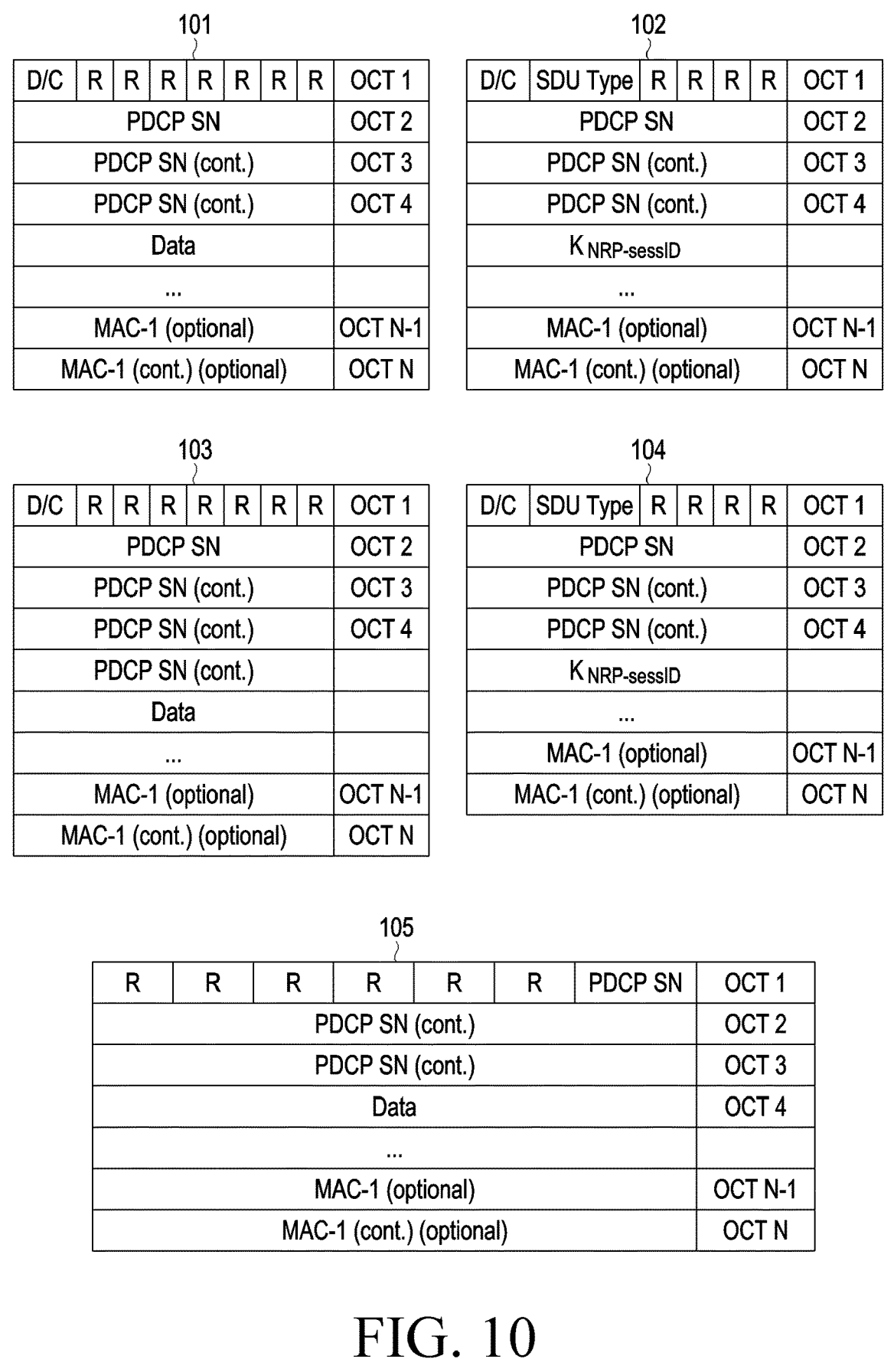

| D/C | R | R | R | R | R | R | OCT 1 |
|-----|---|---|---|---|---|---|-------|
| PDCP SN | | | | | | | OCT 2 |
| PDCP SN (cont.) | | | | | | | OCT 3 |
| PDCP SN (cont.) | | | | | | | OCT 4 |
| Data | | | | | | | |
| ... | | | | | | | |
| MAC-1 (optional) | | | | | | | OCT N-1 |
| MAC-1 (cont.) (optional) | | | | | | | OCT N |

102

| D/C | SDU Type | R | R | R | R | OCT 1 |
|-----|----------|---|---|---|---|-------|
| PDCP SN | | | | | | OCT 2 |
| PDCP SN (cont.) | | | | | | OCT 3 |
| PDCP SN (cont.) | | | | | | OCT 4 |
| $K_{NRP\text{-}sessID}$ | | | | | | |
| ... | | | | | | |
| MAC-1 (optional) | | | | | | OCT N-1 |
| MAC-1 (cont.) (optional) | | | | | | OCT N |

103

| D/C | R | R | R | R | R | R | OCT 1 |
|-----|---|---|---|---|---|---|-------|
| PDCP SN | | | | | | | OCT 2 |
| PDCP SN (cont.) | | | | | | | OCT 3 |
| PDCP SN (cont.) | | | | | | | OCT 4 |
| PDCP SN (cont.) | | | | | | | |
| Data | | | | | | | |
| ... | | | | | | | |
| MAC-1 (optional) | | | | | | | OCT N-1 |
| MAC-1 (cont.) (optional) | | | | | | | OCT N |

104

| D/C | SDU Type | R | R | R | R | OCT 1 |
|-----|----------|---|---|---|---|-------|
| PDCP SN | | | | | | OCT 2 |
| PDCP SN (cont.) | | | | | | OCT 3 |
| PDCP SN (cont.) | | | | | | OCT 4 |
| $K_{NRP\text{-}sessID}$ | | | | | | |
| ... | | | | | | |
| MAC-1 (optional) | | | | | | OCT N-1 |
| MAC-1 (cont.) (optional) | | | | | | OCT N |

105

| R | R | R | R | R | R | PDCP SN | OCT 1 |
|---|---|---|---|---|---|---------|-------|
| PDCP SN (cont.) | | | | | | | OCT 2 |
| PDCP SN (cont.) | | | | | | | OCT 3 |
| Data | | | | | | | OCT 4 |
| ... | | | | | | | |
| MAC-1 (optional) | | | | | | | OCT N-1 |
| MAC-1 (cont.) (optional) | | | | | | | OCT N |

FIG. 10

METHOD AND APPARATUS FOR HANDLING USER PLANE IN WIRELESS COMMUNICATION SYSTEM SUPPORTING MR-MC

CROSS-REFERENCE TO RELATED APPLICATIONS

This application is a continuation of International Application No. PCT/KR2023/001847 designating the United States, filed on Feb. 8, 2023, in the Korean Intellectual Property Receiving Office and claiming priority to Indian Provisional Patent Application No. 202241007371, filed on Feb. 11, 2022, in the Indian Patent Office, and to Indian Complete Patent Application No. 202241007371, filed on Nov. 29, 2022, in the Indian Patent Office, the disclosures of all of which are incorporated by reference herein in their entireties.

BACKGROUND

Field

The disclosure relates to a wireless communication, and for example to a method and a User Equipment (UE) for handling radio resources of an additional network node and a bearer type change in a Multi Radio Access Technology-Multi Connectivity (MR-MC) network.

Description of Related Art

The fifth generation (5G) wireless communication system have been implemented not only in lower frequency bands but also in higher frequency (mm Wave) bands, e.g., 10 GHz to 100 GHz bands, to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system has address different use cases having quite different requirements in terms of data rate, latency, reliability, mobility etc.

For the next generation of wireless communication systems e.g. 6G, beyond 5G various technologies have been under consideration like VLC e.g. Visible Light communication, Terahertz band (THz) e.g. Frequencies from 100 GHz to 3 THz, Infrared wave and Ultra violet wave etc. Among these technologies the THz band is envisioned as a potential candidate for a diverse range of applications, which exist within the nano, micro as well as macro scales. The THz band is able to provide Tbps data rates, and minimal latency but due to high path loss, heavy shadowing and rain attenuation, reliable transmission at higher frequencies is one of the key issues that need to be overcome in order to make the THz band wave systems a practical reality. The lower frequencies in cellular band having robust link characteristics can be utilized together with higher frequencies in mm Wave or THz band to overcome the reliability issues in next generation wireless system.

As described in 3GPP TS 36.300, Dual Connectivity (DC) is a generalization of an Intra-Evolved Universal Terrestrial Radio Access (E-UTRA) DC, where a multiple Receiver (Rx)/Transmitter (Tx) of a User Equipment (UE) configured to utilize radio resources provided by two distinct schedulers in two different nodes connected via a non-ideal backhaul.

Out of two different nodes, one is providing an E-UTRA access and another one is providing a New Radio (NR) access. One scheduler is located in a Master Node (MN) and the other scheduler is located in a Secondary Node (SN). The MN and the SN are connected via a network interface and the MN is connected to a core network.

As described in 3GPP TS 37.340, an Evolved-UMTS Terrestrial Radio Access Network (E-UTRAN) supports the Multi Radio Access technology dual connectivity (MR-DC) via an E-UTRA-NR Dual Connectivity (EN-DC), in which the UE is connected to one Evolved Node B (eNB) that acts as the MN and one gNodeB (gNB) that acts as the SN. The eNB is connected to an Evolved Packet Core (EPC) and the gNB is connected to the eNB via an X2 interface.

Further, Next Generation Radio Access technology Network (NG-RAN) supports Next Generation dual connectivity (NGEN-DC), in which the UE is connected to one eNB that acts as the MN and one gNB that acts as the SN. The eNB or e-LTE is connected to a 5G core network (5GC) and the gNB is connected to the eNB via an Xn interface. Further, the NG-RAN supports NR-E-UTRA Dual Connectivity (NE-DC), in which the UE is connected to one gNB that acts as the MN and one eNB that acts as the SN. The gNB is connected to the 5GC and the eNB is connected to the gNB via the Xn interface.

The Multi-RAT Dual Connectivity (MR-DC) concept enables the UE to configure with both LTE and NR system. There is need to have similar technology for a Sixth Generation (6G) cellular system, as standalone deployments of the 6G cellular system are not feasible for network operators due to Terahertz (THz) band channel characteristics. The UE should have option to perform flexible and seamless Radio Access Technology (RAT) selection between 6G, 5G and 4G cellular systems. The existing methods do not address an MR-MC network system in which the UE is configured to utilize radio resources provided by three or more distinct schedulers located in three or more different network nodes connected via a non-ideal backhaul. There is a need to address the MR-MC network system as multiple radios are involved and have to define a role and design for each node and/or radio. Further, there is User Plane (UP) aspects in the MR-MC network system.

The existing systems do not address the MR-MC network system, whereby the UE is configured to utilize radio resources provided by three or more distinct schedulers, located in three or more different Network (NW) nodes connected via the non-ideal backhaul. The existing systems have a limitation where the UE is configured to utilize radio resources provided by two distinct schedulers in two different nodes connected via the non-ideal backhaul.

Thus, there is a need to address the MR-MC network system as multiple radios are involved and have to define a role and design for each node and/or radio. Further, there is User Plane (UP) aspects in the MR-MC network system.

Currently, the UE supports three radio bearer types e.g. Master Cell Group (MCG) Bearer, Secondary Cell Group (SCG) bearer and split bearer for application of the MR-DC technology. The split bearer is a bearer configured in both MN and SN to utilize radio resources of both cellular systems, increasing data throughput and reliability. Similarly, it is desired to utilize all available radio resources and support all existing bearer types while deploying the MR-MC technology. However, the UE is not capable to fully take advantage of the MR-MC technology with the existing bearer types, which limits the data capacity for the UE irrespective of having an additional RAN node (e.g. 6G network node) serving the UE. So, a new specialized bearer is needed to utilize newly available additional radio resources provided by the new additional RAN.

FIG. 1 is a flowchart illustrating an existing method for handling of a bearer type change for the new specialized bearer, according to conventional art. At 11, consider at 11, the UE is configured with the new specialized bearer and have been connected to a MCG node, a primary SCG node and a secondary SCG node. At 12, consider a network node triggers bearer change at the UE to either MCG bearer, SCG bearer or multiple split bearer. Depending on the type of bearer type change request, corresponding actions are performed as depicted in operations 13-14 with regard to a change to an SCG bearer, in operations 15-16 with regard to a change to an MCG bearer or in operations 17-18 with regard to a change to a split bearer, the bearer type changes involve random access, reestablishment, reset and release, reconfiguration at various layers at the UE like a PDCP layer, a MAC layer, a RLC layer as well as at the network node. Similarly, the remaining operations indicate the actions corresponding to the requested bearer type change. Additionally, a new Resource Block (RB) and security configurations will have to be applied whenever applicable for the bearer type change which involves a lot of signalling and processing at lower layers.

FIGS. 2A and 2B are signal flow diagrams illustrating signaling between the network nodes and the UE during the bearer type change, according to conventional art. The UE maintains an MN context (UE-MN) and an SN context (UE-SN), where the MN and the SN are the network nodes which maintain UE context. Consider, At operation 20, the UE is registered with the MN, and the MN wants to establish the split bearer for the UE At operation 21, the MN requests the SN for SN addition/modification to set up a bearer context. At operation 22, the SN responds with a SN addition/modification acknowledge with a bearer configuration to the MN. At operation 23, the MN requests the UE-MN to establish the split bearer. At operation 24, the UE-MN sends the SN bearer configuration for SN bearer of the split bearer and processes bearer configuration for MCG part of the split bearer as a operation 24*a*.

The operation 24*a* includes performing bearer establishment at the PDCP layer, the RLC layer, the MAC layer. At operation 24*b*, the UE-SN processes the bearer configuration for SCG part of the split bearer by performing bearer establishment at the PDCP layer, the RLC layer, the MAC layer, and RACH by the MAC layer. At operation 25, the UE-SN indicates the UE-MN with a bearer configuration complete. At operation 26, the UE-MN indicates the MN with the bearer configuration complete. At operation 27, the UE has the split bearer established and wants to change the bearer type to MCG only. At operation 28, the MN requests the SN for the SN addition/modification to set up the bearer context. At operation 29, the SN responds with the SN addition/modification acknowledge with bearer configuration to the MN. At operation 30, the MN requests the UE-MN for the bearer type change. At operation 31, the UE-MN sends the SN bearer configuration to the UE-SN for releasing the SN bearer of the split bearer and updating the bearer configuration for the MCG part if any.

At operation 31*a*, the UE-SN processes the bearer configuration for SCG part of the split bearer by performing bearer release at the PDCP layer, the RLC layer and the MAC layer. At operation 32, the UE-SN indicates the UE-MN with the bearer configuration complete. At operation 33, the UE-MN indicates the bearer configuration complete to the MN. The above operations and additional operations (during key change) keeps repeating for each bearer type change request. When a secondary node is newly added, the message exchange would be high for the bearer change. If the existing handling is applied for the three bearers, then the signalling would increase accordingly which will impact the data rates as it will lead to reset, re-establish at various layers (e.g. PDCP layer, a MAC layer, a RLC layer) of the different network nodes and causes loss of data. When more bearers are introduced in a split mechanism, then the signalling overhead will be more. Hence, it is desired for a procedure to change the bearer to and from the new specialized bearer, handling the new specialized bearer, and defining a procedure for updating the bearer type with minimal signalling and less interruption of the data. The procedure may be applicable even to the existing bearer types.

SUMMARY

Embodiments of the disclosure provide a method and system for handling radio resources of an additional network node at user plane and bearer type change in a MR-MC network. The method includes handling the UE and network nodes and updating bearer configurations due to change in a bearer types.

Embodiments of the disclosure provide a method to change the bearer type from the split bearer or the non-split bearers to the multiple split bearer and vice versa.

Embodiments of the disclosure reduce control plane latency and signaling overhead in the MR-MC network as well as existing MR-DC network while changing the bearer types.

Embodiments of the disclosure provide a signaling mechanism at layers such as PDCP layer, RLC layer, MAC layer, etc. and define a cross layer mechanism between the network nodes to handle the bearer type change.

Embodiments of the disclosure provide a method for handling radio resources of an additional network node in a Multi Radio Access Technology-Multi Connectivity (MR-MC) network, a new bearer type as "Multiple Split Bearer" or "Triple Split bearer" is added where all existing bearer type procedures and new bearer type change procedures are applicable to both the existing bearer types and the new bearer type.

In an example embodiment, the method performed by a base station in a wireless communication system supporting the MR-MC further includes receiving, from a UE by the base station, UE capability information including information indicating a support of packet data convergence protocol (PDCP) duplication over a triple split bearer from the UE, where the triple split bearer is a new bearer type. Further, the method includes configuring, by the base station, the triple split bearer at a plurality of network nodes based on the UE capability information.

In an embodiment, the method further includes including, by the network entity, a threshold value of the triple split bearer for uplink e.g. ul-DataTripleSplitThreshold in a PDCP configuration when at least three bearers are configured in the MR-MC network.

In an embodiment, to handle an increased data volume, a PDCP Sequence Number (SN) with size 18 is updated for Signaling Radio Bearers (SRBs), the PDCP SN with size 24 is added for Unacknowledged Mode (UM) Data Radio Bearers (DRBs), Acknowledged Mode (AM) DRBs, and SRBs including sidelink DRBs, sidelink SRBs, and the PDCP SN with size 32 is added for the UM DRBs, the AM DRBs including the sidelink DRBs for unicast.

In an embodiment, to indicate a Buffer Status Report (BSR) in TS 38.323, if more than one non-primary Radio Link Control (RLC) entity is configured and a total amount of PDCP data volume and a RLC data volume pending for an initial transmission in a primary RLC entity and all non-primary RLC entity is equal to or larger than the ul-DataSplitThreshold value (of the triple split bearer), then a PDCP layer indicates the PDCP data volume to both a Medium Access Control (MAC) layer associated with the primary RLC entity and a MAC layer associated with the non-primary RLC entity, wherein the PDCP layer indicates the PDCP data volume as 0 to the MAC layer associated with the RLC entity other than the primary RLC entity and all the non-primary RLC entity with a split bearer.

In an embodiment, the MR-MC network handles the quick recovery of failed access node(s) using one or more available access node(s).

Accordingly, various example embodiments herein provide a method performed by a user equipment (UE) in a wireless communication system supporting the MR-MC. The method includes receiving, by the UE, a bearer suspend message from at least one network node from among the plurality of network nodes. Further the method includes identifying, by the UE, a configuration information of a bearer of a plurality of network layers of the at least one network node upon receiving the bearer suspend message. Further, the method includes suspending, by the UE, the bearer of the plurality of network layers.

In an example embodiment, the method further includes: receiving, by the UE, a bearer resume message from the at least one network node; and resuming, by the UE, the suspended bearer using the stored configuration information of the bearer upon receiving the bearer resume message.

In an example embodiment, the plurality of network layers comprises a radio link control (RLC) layer, the MAC layer, a Packet Data Convergence Protocol (PDCP) layer, and a Radio Resource Control (RRC) layer.

In an example embodiment, the bearer includes one of an existing Master Cell Group (MCG) bearer, a Secondary Cell Group (SCG) bearer, the split bearer, and a new triple split bearer/multiple split bearer.

In an example embodiment, the bearer suspend message and the bearer resume message are Radio Resource Control (RRC) messages, where the UE receives the RRC messages with at least one of a Bearer ID, and the network node(s) to be suspended or resumed, where the network node is at least one of a Master/Primary Node (MN), a Secondary-Primary Node and, a Secondary Node.

In an example embodiment, the bearer suspend message is an existing RRC release message with a new field to indicate a leg or an access node of the bearer to be suspended.

In an example embodiment, the bearer resume message is an existing RRC resume message with the new field to indicate the leg or the access node to be resumed, where if any previously suspended access node is not included in the bearer resume message then the bearer resume message implicitly indicates that the access node may continue to remain in a suspended state or may be released.

In an example embodiment, the bearer suspend message is a new RRC message RRCBearerSuspend indicating the access node to be suspended, where the bearer resume message is a new RRC message RRCBearerResume indicating the access node to be resumed.

In an example embodiment, suspending the bearer of the plurality of network layers, comprises: sending a suspend request from the RRC layer to the PDCP layer; suspending a configuration of the bearer at the PDCP layer; sending a rlcSuspend message from the PDCP layer to the RLC layer; suspending a configuration of the bearer at the RLC layer upon receiving the rlcSuspend message; sending a macSuspend message from the RLC layer to the MAC layer; and suspending a configuration of the bearer at the MAC layer upon receiving the macSuspend message.

In an example embodiment, resuming the suspended bearer, comprises: sending a resume request from the RRC layer to the PDCP layer; resuming a configuration of the bearer at the PDCP layer; sending a rlcResume message from the PDCP layer to the RLC layer; resuming a configuration of the bearer at the RLC layer upon receiving the rlcResume message; sending a macResume message from the RLC layer to the MAC layer; and resuming a configuration of the bearer at the MAC layer upon receiving the macResume message.

In an example embodiment, the bearer suspend message is a new MAC control element comprises of the Bearer ID and a Logical Channel ID (LCID) of the bearer of particular leg/access nodes to be suspended, where a new LCID "Suspend-Resume for LCID" is added to LCID values table for Downlink Shared Channel (DL-SCH).

In an example embodiment, suspending the bearer of the plurality of network layers, comprises: suspending a configuration of the bearer at the MAC layer; sending a rlcSuspend message from the MAC layer to the RLC layer; suspending a configuration of the bearer at the RLC layer upon receiving the rlcSuspend message; sending a pdcpSuspend message from the RLC layer to the PDCP layer; suspending a configuration of the bearer at the PDCP layer upon receiving the pdcpSuspend message; sending a notification to the RRC layer upon suspending the configurations of the bearer; and updating the suspended bearer configuration at the RRC layer.

In an example embodiment, resuming the suspended bearer, comprises: resuming a configuration of the bearer at the MAC layer; sending a rlcResume message from the MAC layer to the RLC layer; resuming a configuration of the bearer at the RLC layer upon receiving the rlcResume message; sending a pdcpResume message from the RLC layer to the PDCP layer; resuming a configuration of the bearer at the PDCP layer upon receiving the pdcpResume message; sending a notification to the RRC layer upon resuming the configurations of the bearer; and updating the resumed bearer configuration at the RRC layer.

In an example embodiment, the method is applicable to all existing bearer types and new bearer types.

Accordingly, the various example embodiments herein provide a UE in a wireless communication system supporting the MR-MC. The UE includes a transceiver and a processor, the processor is configured to receive, via the transceiver, a bearer suspend message from at least one network node from among a plurality of network nodes. Further, the processor is configured to identify configuration information of a bearer of a plurality of network layers of the at least one network node upon receiving the bearer suspend message. Further, the processor is configured to suspend the bearer of the plurality of network layers.

Accordingly, the various example embodiments herein provide a base station in a wireless communication system supporting the MR-MC. the base station includes a transceiver and a processor. The processor is configured to receive, via the transceiver from a UE, UE capability information including information indicating a support of PDCP duplication over a triple split bearer from the UE, where the triple split bearer is a new bearer type. Further, The processor is configured to configure the triple split bearer at a plurality of network nodes based on the UE capability information.

Accordingly, the various example embodiments herein provide a non-transitory computer readable storage medium may include one or more programs, the one or more programs comprising instructions configured to, when executed by at least one processor of a UE, cause the UE in a wireless communication system supporting multi radio access technology-multi connectivity (MR-MC) to receive a bearer suspend message from at least one network node from among the plurality of network nodes. The instructions may be configured to cause the UE to identify configuration information of a bearer of a plurality of network layers of the at least one network node upon receiving the bearer suspend message. The instructions may be configured to cause the UE to suspend the bearer of the plurality of network layers.

Accordingly, the various example embodiments herein provide a non-transitory computer readable storage medium may include one or more programs, the one or more programs comprising instructions configured to, when executed by at least one processor of a base station, cause the base station in a wireless communication system supporting multi radio access technology-multi connectivity (MR-MC) to receive, from a UE, UE capability information including information indicating a support of packet data convergence protocol (PDCP) duplication over a triple split bearer from the UE, where the triple split bearer is a new bearer type. The instructions may be configured to cause the base station to configure the triple split bearer at a plurality of network nodes based on the UE capability information.

These and other aspects of the various example embodiments herein will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the embodiments, and the embodiments herein include all such modifications.

BRIEF DESCRIPTION OF THE DRAWINGS

This disclosure is illustrated in the accompanying drawings, throughout which like reference letters indicate corresponding parts in the various figures. The above and other aspects, features and advantages of certain embodiments of the present disclosure will be more apparent from the following detailed description, taken in conjunction with the accompanying drawings, in which:

FIG. 8 is a flowchart illustrating an example method for handling the bearer type change or the update of the bearer configuration at the UE and the network nodes through the MAC layer or PHY layer or layer 2 based triggered mechanism, according to various embodiments;

FIG. 10 is a diagram illustrating example structures of data Protocol Data Units (PDUs), according to various embodiments.

DETAILED DESCRIPTION

Figure 1:
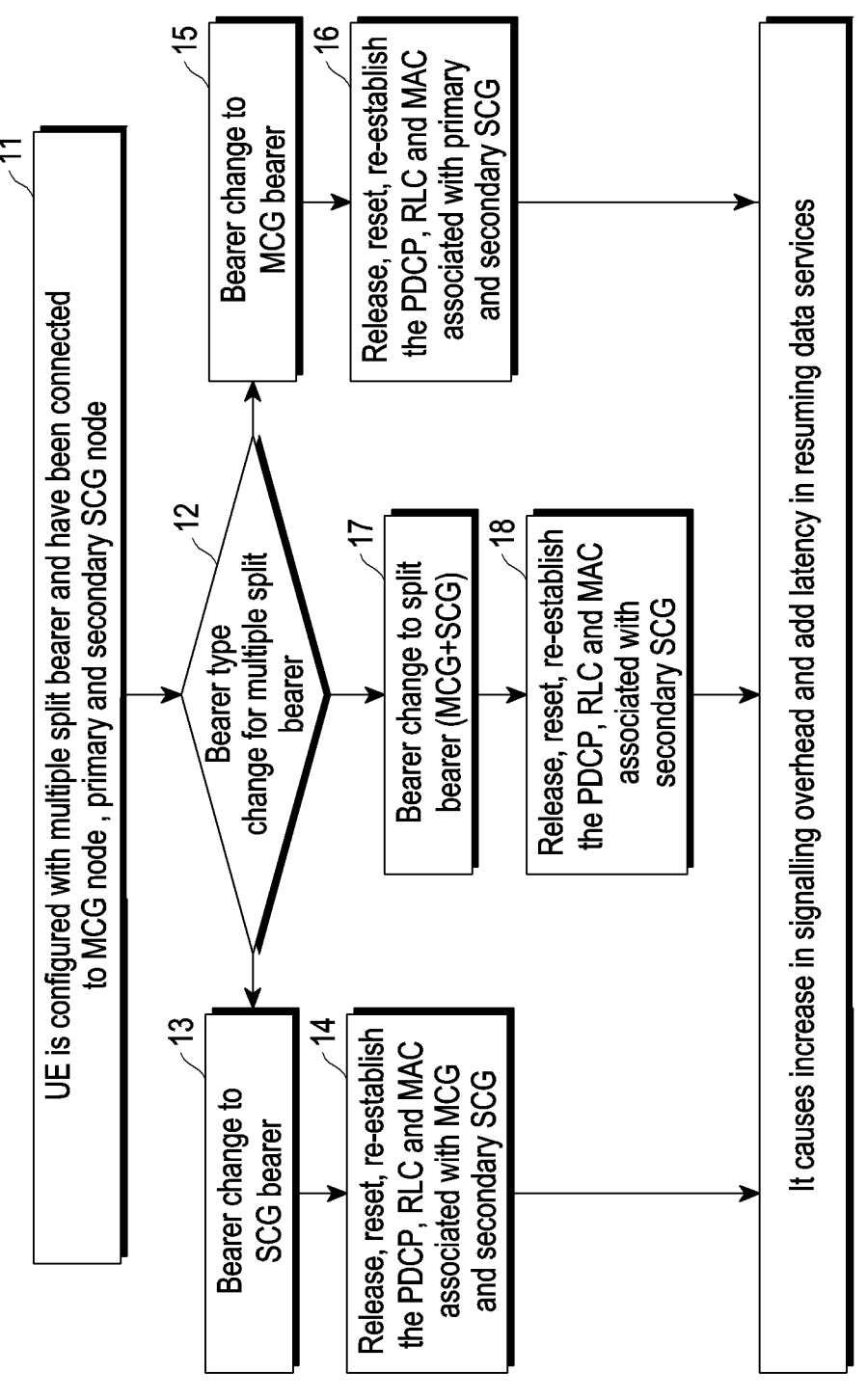
FIG. 1 is a flowchart illustrating an existing method for handling of a bearer type change for a new specialized bearer, according to a conventional art.
Figure 2A:
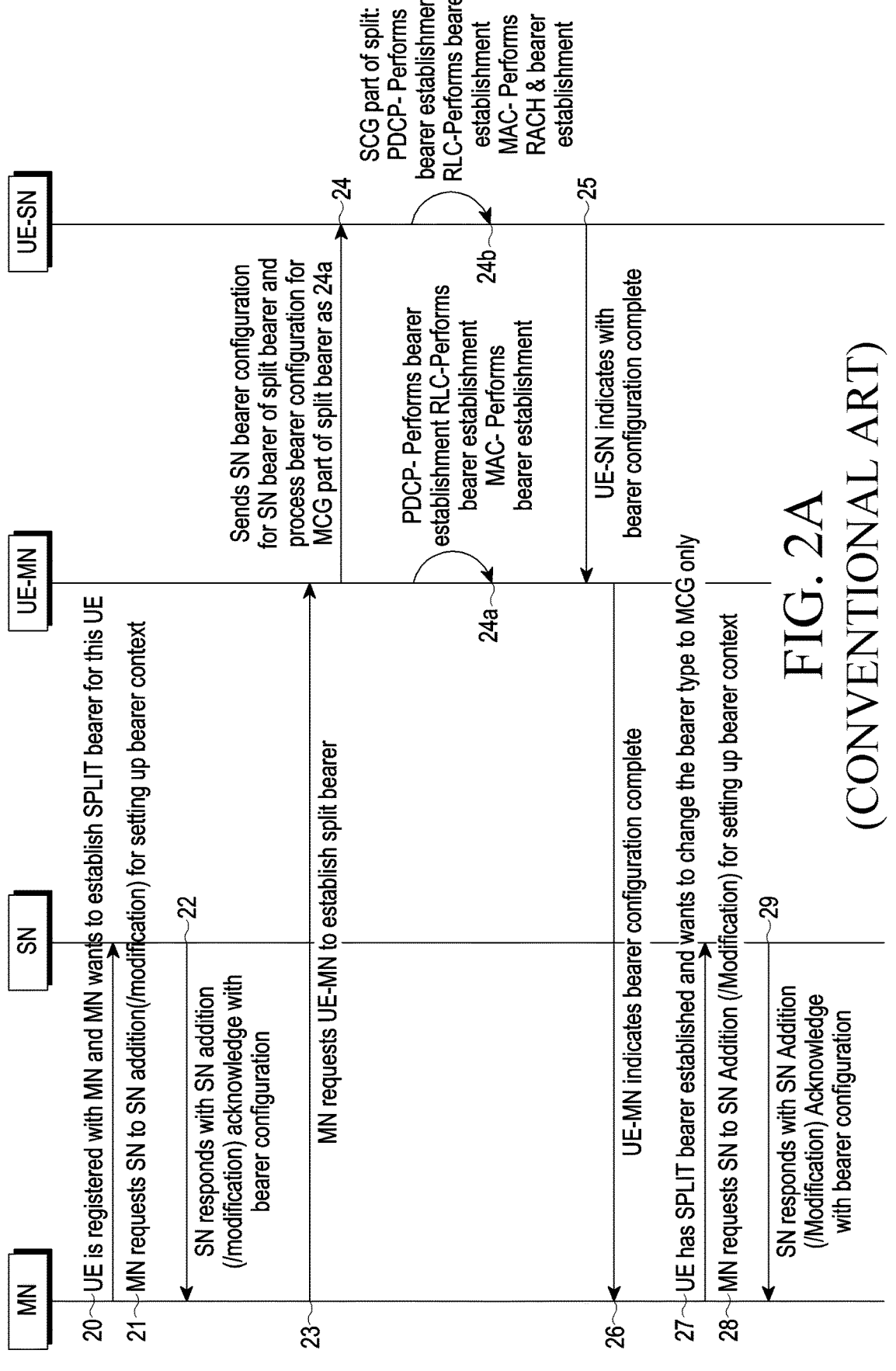
FIGS. 2A and 2B are signal flow diagrams illustrating signaling between network nodes and a UE during the existing bearer type change procedure, according to conventional art.
Figure 2B:
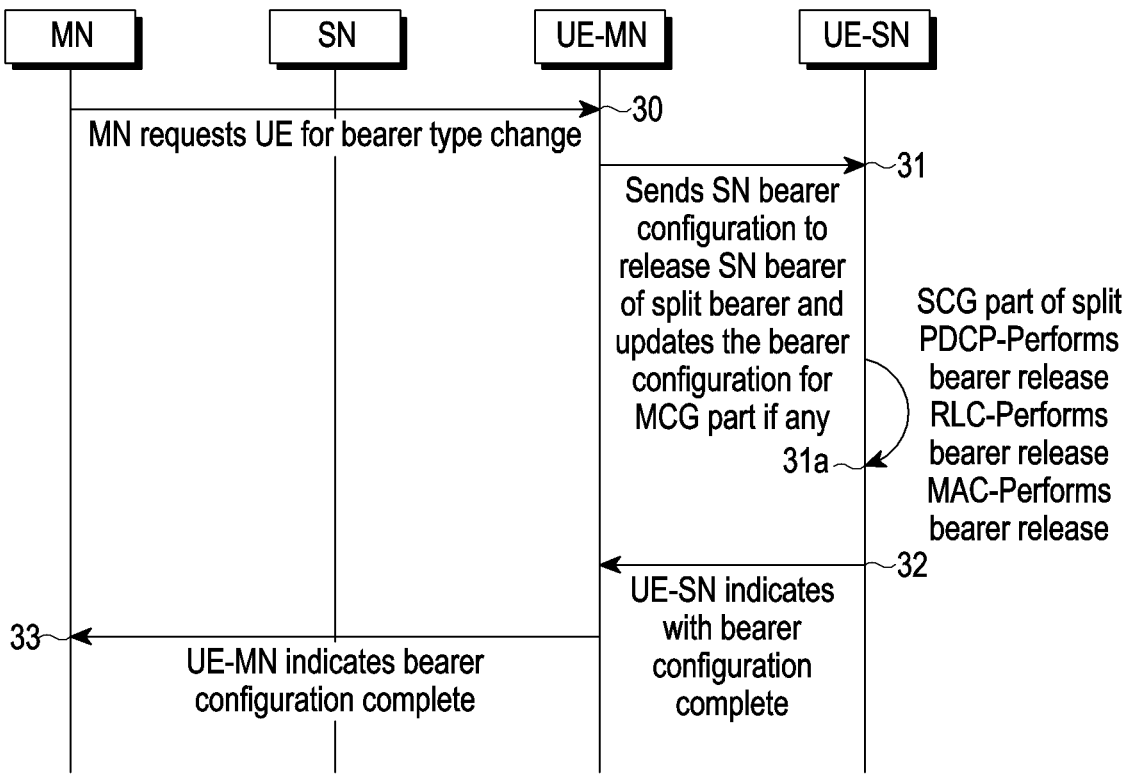

The various example embodiments herein and the various features and advantageous details thereof are explained more fully with reference to the non-limiting embodiments that are illustrated in the accompanying drawings and detailed in the following description. Descriptions of well-known components and processing techniques may be omitted so as to not unnecessarily obscure the embodiments herein. Also, the various example embodiments described herein are not necessarily mutually exclusive, as various embodiments can be combined with one or more embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Various embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

As used herein, each of such phrases as "A and/or B", "A or B", "at least one of A and B", "at least one of A or B", "A, B, or C,", "at least one of A, B, and C" and "at least one of A, B, or C" may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order).

In the disclosure, the user equipment (UE) may refer to a terminal, MS (mobile station), cellular phone, smartphone, computer, or various electronic devices capable of performing communication functions. According to the disclosure, the base station may be an entity allocating a resource to the UE and may be at least one of a gNode B, gNB, eNode B, eNB, Node B, BS, radio access network (RAN), base station controller, or node on network.

The accompanying drawings are used to aid in understanding various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

In the existing methods and systems, a bearer type change occurs with or without a handover or a secondary node change procedure. Through the handover or the secondary node change always causes data loss or interruption in services. There are few bearer type changes which does not involve change in a PDCP termination point or keys or a PDCP version. Those bearer type changes can be supported without mobility procedure e.g. the handover or the secondary node change procedure. This disclosures describes about bearer type change that can occur with or without mobility and corresponding L2 handling.

Accordingly, various example embodiments herein provide a method for handling radio resources of an additional network node in a Multi Radio Access Technology-Multi Connectivity (MR-MC) network, a new bearer type as "Multiple Split Bearer" or "Triple Split bearer" is added where all existing bearer type procedures and the new bearer type change procedures are applicable to both the existing bearer types and the new bearer type.

Accordingly, various embodiments herein provide a method for handling a bearer type change in the MR-MC network by the UE. The method includes receiving, by the UE, a bearer suspend message from at least one network node from among the plurality of network nodes. Further, the method includes storing, by the UE, a configuration information of a radio bearer of a plurality of network layers of the at least one network node upon receiving the bearer suspend message. Further, the method includes suspending, by the UE, the bearer of the plurality of network layers.

Accordingly, various embodiments herein provide the UE for handling the bearer type change in the MR-MC network. The UE includes a MR-MC controller, a memory, a processor, where the MR-MC controller is coupled to the memory and the processor. The MR-MC controller is configured to receive a bearer suspend or resume message from at least one network node from among a plurality of network nodes.

The MR-MC controller is configured to store a configuration information of a bearer of a plurality of network layers of the at least one network node upon receiving the bearer suspend message and restoring the suspended bearer configuration upon receiving the bearer resume message. The MR-MC controller is configured to suspend and/or resume the bearer of the plurality of network layers.

Embodiments herein provide a method and system for handling bearer type change and user plane in multi radio multi-connectivity network system. The disclosed method provides a method to handle bearer type change for new bearer type "multiple split bearer". The disclosed method illustrates action which takes place when this new bearer type changes to another bearer type. The disclosed method provides a method to reduce signalling mechanism which involves suspending and resuming the bearer configuration at all layers to reduce the signalling overhead. This new method is applicable for the existing bearer types.

Unlike existing methods and systems, the UE uses a new bearer type which helps in achieving efficient utilization of network resources and an optimized method to handle bearer type change reducing signalling overhead as well as dynamic enabling/disabling of a bearer. New bearer type has been disclosed for the next generation system to utilize the benefits of MR-MC deployment. The disclosed method includes an optimized procedure to handle bearer type change that is applicable to both existing and newly added bearer types. The disclosed method reduces the signalling overhead and improves the overall time required to configure/activate a bearer type after change.

Referring now to the drawings, and more particularly to FIGS. 3 through 10, there are shown various example embodiments.

Figure 3:
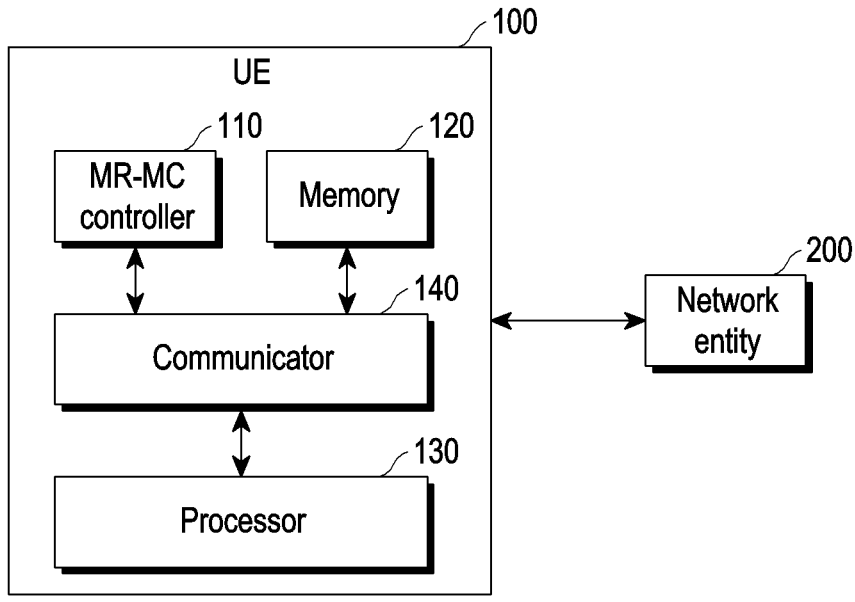
FIG. 3 is a block diagram illustrating an example configuration of the UE for handling radio resources of an additional network node and the bearer type change in a MR-MC network, according to various embodiments.

FIG. 3 is a block diagram illustrating an example configuration of a User Equipment (UE) (100) for handling radio resources of an additional network node and a bearer type change in a Multi Radio Access Technology-Multi Connectivity (MR-MC) network, according to various embodiments. The UE (100) is connected to a network entity (e.g. Master Node (MN), Secondary Node (SN), etc.) (200) in the MR-MC network. Examples of the UE (100) include, but are not limited to a smartphone, a tablet computer, a Personal Digital Assistance (PDA), a desktop computer, an Internet of Things (IoT), a wearable device, etc. In an embodiment, the UE (100) includes a MR-MC controller (e.g., including various processing and/or control circuitry) (110), a memory (120), a processor (e.g., including processing circuitry) (130), and a communicator (e.g., including communication circuitry) (140). The MR-MC controller (110) may be implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like. The UE may include a transceiver for transmitting and/or receiving signals.

In an embodiment, a new bearer type as "Multiple Split Bearer" or "Triple Split bearer" is added in the MR-MC network, where existing bearer type procedures and the new bearer type change procedures are applicable to both existing bearer types and the new bearer type.

In an embodiment, the MR-MC network handles the quick recovery of failed access node(s) using one or more available access node(s). In an embodiment, the network entity (e.g. MN, SN, etc.) (200) in the MR-MC network receives a UE capability Information Element (IE) indicating a support of Packet Data Convergence Protocol (PDCP) duplication over the triple split bearer from a UE (100). Further, the network entity (200) configures the triple split bearer at a plurality of network nodes based on the indication. Further, the network entity (200) includes a threshold value of the triple split bearer for uplink in a PDCP configuration e.g. ul-DataTripleSplitThreshold when at least three bearers are configured in the MR-MC network.

In an embodiment, to handle an increased data volume, a PDCP Sequence Number (SN) with size 18 is updated for Signaling Radio Bearers (SRBs), the PDCP SN with size 24 is added for Unacknowledged Mode (UM) Data Radio Bearers (DRBs), Acknowledged Mode (AM) DRBs, and SRBs including sidelink DRBs, sidelink SRBs, and the PDCP SN with size 32 is added for the UM DRBs, the AM DRBs including the sidelink DRBs for unicast.

In an embodiment, to indicate a Buffer Status Report (BSR), if more than one non-primary Radio Link Control (RLC) entity is configured and a total amount of PDCP data volume and a RLC data volume pending for an initial transmission in a primary RLC entity and all non-primary RLC entity is equal to or larger than the threshold value of the triple split bearer, then a PDCP layer indicates the PDCP data volume to both a Medium Access Control (MAC) layer associated with the primary RLC entity and a MAC layer associated with the non-primary RLC entity, wherein the PDCP layer indicates the PDCP data volume as 0 to the MAC layer associated with the RLC entity other than the primary RLC entity and all the non-primary RLC entity with a split bearer.

The MR-MC controller (110) may include various processing and/or control circuitry and receives a bearer suspend message from a network node from among the plurality of network nodes. Further, the MR-MC controller (110) stores a configuration information of a bearer of a plurality of network layers of the network node upon receiving the bearer suspend message. Further, the MR-MC controller (110) suspends the bearer of the plurality of network layers. In an embodiment, the MR-MC controller (110) receives a bearer resume message from the network node. Further, the MR-MC controller (110) resumes the suspended bearer using the stored configuration information of the bearer upon receiving the bearer resume message.

In an embodiment, the plurality of network layers comprises a RLC layer, the MAC layer, a Packet Data Convergence Protocol (PDCP) layer, and a Radio Resource Control (RRC) layer. In an embodiment, the bearer is one of an existing Master Cell Group (MCG) bearer, a Secondary Cell Group (SCG) bearer, the split bearer, and a new triple split bearer. In an embodiment, the bearer suspend message and the bearer resume message are Radio Resource Control (RRC) messages, where the UE (100) receives the RRC messages with at least one of a Bearer ID, and the network node(s) to be suspended or resumed, where the network node/entity (200) is at least one of a Master/Primary Node (MN), a Secondary-Primary Node and, a Secondary Node.

In an embodiment, the bearer suspend message is an existing RRC release message with a new field to indicate a leg or an access node of the bearer to be suspended. In an embodiment, the bearer resume message is an existing RRC resume message with the new field to indicate the leg or the access node to be resumed, where if any previously suspended access node is not included in the bearer resume message then the bearer resume message implicitly indicates that the access node may continue to remain in a suspended state or may be released.

In an embodiment, the bearer suspend message is a new RRC message RRCBearerSuspend indicating the access node to be suspended, and the bearer resume message is a new RRC message RRCBearerResume indicating the access node to be resumed.

In an embodiment, to suspend the bearer of the plurality of network layers, the MR-MC controller (110) sends a suspend request from the RRC layer to the PDCP layer. Further, the MR-MC controller (110) suspends a configuration of the bearer at the PDCP layer. Further, the MR-MC controller (110) sends an rlcSuspend message from the PDCP layer to the RLC layer. Further, the MR-MC controller (110) suspends a configuration of the bearer at the RLC layer upon receiving the rlcSuspend message. Further, the MR-MC controller (110) sends a macSuspend message from the RLC layer to the MAC layer. Further, the MR-MC controller (110) suspends a configuration of the bearer at the MAC layer upon receiving the macSuspend message.

In an embodiment, to resume the suspended bearer, the MR-MC controller (110) sends a resume request from the RRC layer to the PDCP layer. Further, the MR-MC controller (110) resumes a configuration of the bearer at the PDCP layer. Further, the MR-MC controller (110) sends an rlcResume message from the PDCP layer to the RLC layer. Further, the MR-MC controller (110) resumes a configuration of the bearer at the RLC layer upon receiving the rlcResume message. Further, the MR-MC controller (110) sends a macResume message from the RLC layer to the MAC layer. Further, the MR-MC controller (110) resumes a configuration of the bearer at the MAC layer upon receiving the macResume message.

In an embodiment, the bearer suspend message is a new MAC control element comprises of the bearer ID and a Logical Channel ID (LCID) of the bearer of particular leg/access nodes to be suspended, where a new LCID "Suspend-Resume for LCID" is added to LCID values table for Downlink Shared Channel (DL-SCH).

In an embodiment, to suspend the bearer of the plurality of network layers, the MR-MC controller (110) suspends a configuration of the bearer at the MAC layer. Further, the MR-MC controller (110) sends an rlcSuspend message from the MAC layer to the RLC layer. Further, the MR-MC controller (110) suspends a configuration of the bearer at the RLC layer upon receiving the rlcSuspend message. Further, the MR-MC controller (110) sends a pdcpSuspend message from the RLC layer to the PDCP layer. Further, the MR-MC controller (110) suspends a configuration of the bearer at the PDCP layer upon receiving the pdcpSuspend message. Further, the MR-MC controller (110) sends a notification to the RRC layer upon suspending the configurations of the bearer. Further, the MR-MC controller (110) updates the suspended bearer configuration at the RRC layer.

In an embodiment, to resume the suspended bearer, the MR-MC controller (110) resumes a configuration of the bearer at the MAC layer. Further, the MR-MC controller (110) sends an rlcResume message from the MAC layer to the RLC layer. Further, the MR-MC controller (110) resumes a configuration of the bearer at the RLC layer upon receiving the rlcResume message. Further, the MR-MC controller (110) sends a pdcpResume message from the RLC layer to the PDCP layer. Further, the MR-MC controller (110) resumes a configuration of the bearer at the PDCP layer upon receiving the pdcpResume message. Further, the MR-MC controller (110) sends a notification to the RRC layer upon resuming the configurations of the bearer. Further, the MR-MC controller (110) updates the resumed bearer configuration at the RRC layer.

Other than existing bearer types such as the MCG bearer, the SCG bearer, the split bearer, etc, a specialized bearer referred, for example, to as a multiple split bearer or the triple split bearer is disclosed to allow the UE (100) to receive data from that a new additional RAN (e.g. 6G RAN) in the MR-MC network. With the configured triple split bearer, the UE (100) can receive the data from all the three network nodes (e.g. LTE, NR, Wi-Fi, 6G or any RAT introduced in the future). The network node can configure the multiple split bearer with the following configuration as an example: NR PDCP container+LTE configurations on RLC, MAC and physical layers+NR configuration container on NR RLC, MAC and physical layers, +NR configuration container on NR RLC, MAC and physical layers or Wi-Fi configuration container on MAC and physical layers etc.

The multiple split bearer whose PDCP termination point is at the MN may be referred to, for example, as a split bearer terminated at MN or MCG split bearer. The multiple split bearer whose PDCP termination point is at the SN can be referred to, for example, as a split bearer terminated at SN or a SCG split bearer or a secondary SCG split SRB/DRB. These multiple split bearers can be either transparent to the UE (100) or the UE (100) is aware of the termination point of the multiple split bearer. This is based on number of configured security keys. Like the split bearer, the multiple split bearer changes to a split or a single bearer and vice-versa has to be handled properly to ensure service continuity.

The memory (120) stores instructions to be executed by the processor (130). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in various examples, be considered a non-transitory storage medium. The "non-transitory" storage medium is not embodied in a carrier wave or a propagated signal. However, the term "non-transitory" should not be interpreted that the memory (120) is non-movable. In various examples, the memory (120) can be configured to store larger amounts of information than its storage space. In certain examples, a non-transitory storage medium may store data that can, over time, change (e.g., in Random Access Memory (RAM) or cache). The memory (120) can be an internal storage unit or it can be an external storage unit of the UE (100), a cloud storage, or any other type of external storage.

The processor (130) may include various processing circuitry and is configured to execute instructions stored in the memory (120). The processor (130) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (130) may include multiple cores to execute the instructions. The communicator (140) is configured for communicating internally between hardware components in the UE (100). Further, the communicator (140) is configured to facilitate the communication between the UE (100) and other devices via one or more networks (e.g. Radio technology). The communicator (140) includes an electronic circuit specific to a standard that enables wired or wireless communication.

Although FIG. 3 shows the hardware components of the UE (100) it is to be understood that various embodiments are not limited thereon. In various embodiments, the UE (100) may include less or a greater number of components. Further, the labels or names of the components are used only for illustrative purposes and does not limit the scope of the disclosure. One or more components can be combined together to perform same or substantially similar function for handling the bearer in the MR-MC network.

Figure 4:
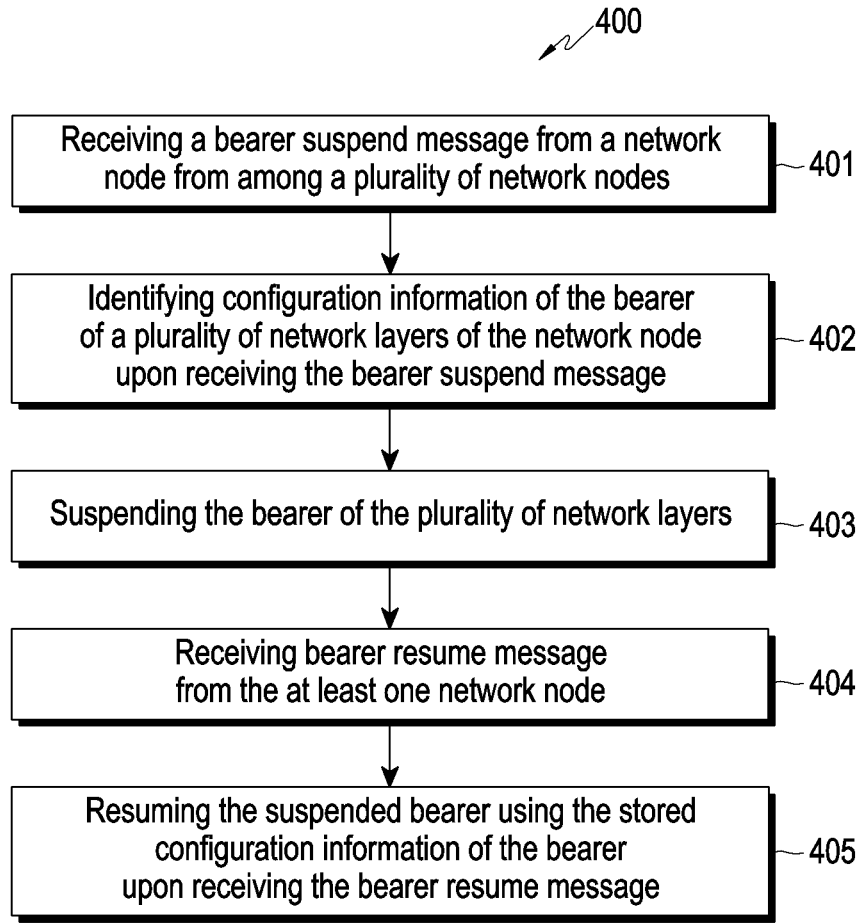
FIG. 4 is a flowchart illustrating an example method and procedure for bearer type change in the MR-MC network by the UE, according to various embodiments.

FIG. 4 is a flowchart (400) illustrating an example method and procedure for the bearer type change in the MR-MC network by the UE (100), according to various embodiments. In an embodiment, the method allows the MR-MC controller (110) to perform operations 401-405 of the flowchart (400). At operation 401, the method includes receiving the bearer suspend message from the network node among a plurality of network nodes. At operation 402, the method includes storing (identifying) the configuration information of the bearer of the plurality of network layers of the network node upon receiving the bearer suspend message. At operation 403, the method includes suspending the bearer of the plurality of network layers. At operation 404, the method includes receiving the bearer resume message from the network node. At operation 405, the method includes resuming the suspended bearer using the stored configuration information of the bearer upon receiving the bearer resume message. In an embodiment, the disclosed method is applicable to all the existing bearer types and new bearer types.

The various actions, acts, blocks, steps, operations or the like in the flowchart (400) may be performed in the order presented, in a different order, or simultaneously. Further, in various embodiments, some of the actions, acts, blocks, steps, operations or the like may be omitted, added, modified, skipped, or the like without departing from the scope of the disclosure.

Figure 5:
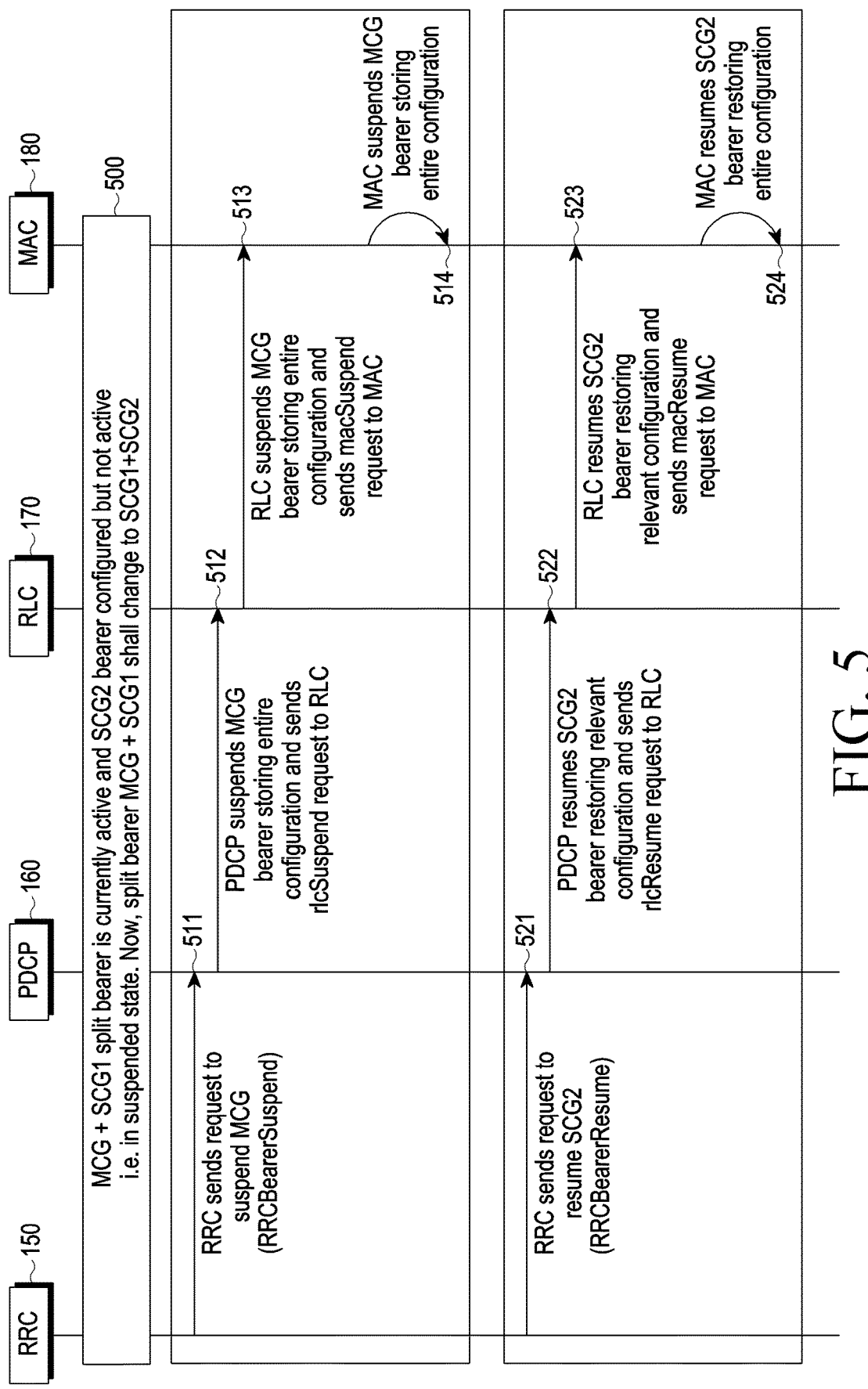
FIG. 5 is a signal flow diagram illustrating example signaling between a RRC layer, a PDCP layer, a RLC layer, and a MAC layer for handling the bearer type change or an update of a bearer configuration through a RRC layer or layer 3 based triggered mechanism, according to various embodiments.

FIG. 5 is a signal flow diagram illustrating example signaling between the RRC layer, the PDCP layer, the RLC layer, and the MAC layer for handling the bearer type change or the update of the bearer configuration through the RRC layer or layer 3 based triggered mechanism, according to various embodiments. At operation 500, consider the MCG+SCG1 split bearer is currently active and the SCG2 bearer is configured but not active e.g. in suspended state. For changing the split bearer MCG+SCG1 to SCG1+SCG2, the UE (100) performs operations 511-514 to suspend the MCG bearer, and operations 521-524 to resume the SCG2 bearer.

At operation 511, the RRC (150) sends an RRCBearerSuspend request to the PDCP (160) for suspending the MCG bearer. At operation 512, the PDCP (160) suspends the MCG bearer, stores the MCG bearer configuration and sends an rlcSuspend request to the RLC (170). At operation 513, the RLC (170) suspends the MCG bearer, stores the MCG bearer configuration and sends a macSuspend request to the MAC (180). At operation 514, the MAC (180) suspends the MCG bearer and stores the entire configuration.

At operation 521, the RRC (150) sends an RRCBearerResume request to the PDCP (160) for resuming the SCG2 bearer. At operation 522, the PDCP (160) resumes the SCG2 bearer by restoring a SCG2 bearer configuration and sends a rlcResume request to the RLC (170). At operation 523, the RLC (170) resumes the SCG2 bearer by restoring the SCG2 bearer configuration and sends a macResume request to the MAC (180). At operation 524, the MAC (180) resumes the SCG2 bearer by restoring the SCG2 bearer configuration.

To avoid signaling and processing overhead in the conventional system, a mechanism is introduced in this disclosure for the bearer type change procedure. The mechanism allows the UE (100) to suspend and resume the radio bearer configuration at all layers to reduce the signalling overhead and decrease latency in bringing up the bearer configuration. With the disclosed method, whenever the UE (100) receives the suspend request is through the RRC message like the RRC suspend or the MAC message or a layer 1 message, then the UE (100) suspends the entire bearer configuration and stores the bearer configuration into the memory (120) to be used upon resumption.

Upon receiving resume request for the suspended bearer through the RRC message or the MAC message or the layer 1 message, then the UE (100) resumes the suspended bearer with the stored configuration until explicit configuration modification (like security key change which is unavoidable with current approach, etc.) is specified and this explicit configuration can be included in the resume message itself or can be followed up with a RRC reconfiguration message. The RRC message can be the RRC suspend which has an Information Element (IE) for the bearer ID. The bearer ID signifies that which bearer needs to be suspended. In an embodiment, the UE (100) receives the MAC CE including the bearer ID and the logical channel ID to indicate which bearer is to be suspended/resumed. Thus the UE (100) reduces the signalling exchange, a time to bring up the bearer (with its configuration) and easily and can frequently perform the bearer type changes if required.

In an embodiment, the suspend-resume mechanism can be applied to the existing bearer type change with a few changes in the current handling. To understand, consider a few of the following cases of the combinations of bearer type change and their handling.

Case 1: MCG+SCG1 is the activated split bearer and is changed to multiple split bearer. As the MCG bearer is already active, no action would be required when there is no key change and in case of key change, existing procedural actions may be performed e.g. based on the deployment & bearer type the MAC/RLC behaviour depends on the solu-tion selected by the network like either MAC reset-RLC re-establishment along with reconfiguration with sync (optionally) may be triggered. The LCID can be changed via RLC release and addition for same RB including RLC re-establishment or via reconfiguration of RLC bearer with RLC re-establishment.

Case 2: MCG+SCG1 to SCG1+SCG2 in which the MCG bearer is to be removed and the SCG2 bearer is to be added as part of the split bearer with SCG1 being maintained. Here, the MCG bearer may be suspended to be resumed in other cases of bearer type change requiring the MCG bearer.

Case 3: MCG+SCG1 to MCG+SCG2, in which the MCG bearer is maintained while the SCG bearer is being changed. Here, no action or actions specified in case 1 may be executed based on no key change and key change respectively. While the SCG1 bearer is suspended, then SCG2 bearer may either be established if configured/activated for the first time or resumed if it has been suspended applying the change in configuration. Alternatively, the SCG1 bearer can be re-established and/or released as per the existing applicable procedures based on deployments.

When the UE (100) receives the bearer type change with suspend-resume approach, the UE (100) performs the actions defined for the suspend-resume received either via the RRC or the MAC CE as indicated above. Upon receiving the suspend message, the UE (100) suspends and stores the bearer configuration to resume when the resume request is received.

A table (referred to as table 1 in the disclosure) in 3GPP TS 37.340 is updated based on the disclosed mechanism for the bearer type change. The table has been modified for the triple split bearer with actions and impact on a user plane will happen when bearer type change occurs. Procedures specified for the SCG is applicable to both secondary nodes accordingly. Table 1 illustrates the handling for bearer type change with and without a security key change due to a change of the termination point.

TABLE 1

| Bearer type change from row to col | MCG | | Split | | SCG | | Triple Split | |
|---|---|---|---|---|---|---|---|---|
| | no change of termination point (no key change) | change of termination point (key change) | no change of termination point (no key change) | change of termination point (key change) | no change of termination point (no key change) | change of termination point (key change) | no change of termination point (no key change) | no change of termination point (key change) |
| SCG | PDCP: Recovery<br>MCG RLC: Establish or Resume<br>MCG MAC: Reconfigure or Resume, Reconfigure<br>SCG RLC: See Note 4 or Suspend<br>SCG MAC: Reconfigure or Suspend | PDCP: Re-establish<br>MCG RLC: Establish or Resume<br>MCG MAC: Reconfigure or Resume, Reconfigure<br>SCG RLC: See Note 4 or Suspend SCG MAC: Reconfigure or Suspend | PDCP: Reconfigure<br>MCG RLC: Establish or Resume<br>MCG MAC: Reconfigure or Resume, Reconfigure<br>SCG RLC: No action or Resume SCG MAC: No action or Resume, Reconfigure | PDCP: Re-establish<br>MCG RLC: Establish or Resume<br>MCG MAC: Reconfigure or Resume, Reconfigure<br>SCG RLC: See Note 1 or Resume<br>SCG MAC: See Note 1 or Resume, Reconfigure | N/A | PDCP: Re-establish<br>MCG RLC: No action<br>MCG MAC: No action<br>SCG RLC: See Note 1<br>SCG MAC: See Note 1 | PDCP: Reconfigure<br>MCG RLC: Note 5<br>MCG MAC: Note 5 SCG<br>RLC: Establish or Resume<br>SCG MAC: Establish or Resume, Reconfigure | PDCP: Re-establish<br>MCG RLC: Note 5<br>MCG MAC: Note 5<br>SCG RLC: Establish or Resume<br>SCG MAC: Establish or Resume, Reconfigure |
| Triple Split | PDCP: Recovery<br>MCG RLC: No action<br>MCG MAC: No action | PDCP: Re-establish + Recovery<br>MCG RLC: Recovery<br>MCG RLC: See Note 5<br>MCG MAC: MCG MAC | PDCP: Reconfigure + Recovery<br>MCG RLC: See Note 5<br>MCG MAC: | PDCP: Re-establish + Recovery<br>MCG RLC: See Note 5<br>MCG MAC: | PDCP: Reconfigure + Recovery<br>MCG RLC: See Note 5<br>MCG MAC: | PDCP: Re-establish + Recovery<br>MCG RLC: See Note 5<br>MCG MAC: | N/A | PDCP: Re-establish<br>MCG RLC: See Note 5<br>MCG MAC: See Note 5 |

TABLE 1-continued

| Bearer type change from row to col | MCG | | Split | | SCG | | Triple Split | |
|---|---|---|---|---|---|---|---|---|
| | no change of termination point (no key change) | change of termination point (key change) | no change of termination point (no key change) | change of termination point (key change) | no change of termination point (no key change) | change of termination point (key change) | no change of termination point (no key change) | no change of termination point (key change) |
| | SCG RLC: Note 6 SCG MAC: Note 6 | See Note 5 SCG RLC: Note 6 SCG MAC: Note 6 | See Note 5SCG RLC: Note 6 SCG MAC: Note 6/Release or suspend | See Note 5 SCG RLC: Note 6 SCG MAC: Note 6/Release or suspend | See Note 5 SCG RLC: Note 6 SCG MAC: Note 6/Release or suspend | See Note 5 SCG RLC: Note 6 SCG MAC: Note 6/Release or suspend | | SCG RLC: Note 6 SCG MAC: Note 6/Release or suspend |
| SCG | PDCP: Recovery MCG RLC: Establish or Resume MCG MAC: Reconfigure or Resume, Reconfigure SCG RLC: See Note 4 or Suspend SCG MAC: Reconfigure or Suspend | PDCP: Re-establish MCG RLC: Establish or Resume MCG MAC: Reconfigure or Resume, Reconfigure SCG RLC: See Note 4 or Suspend SCG MAC: Reconfigure or Suspend | PDCP: Reconfigure MCG RLC: Establish or Resume MCG MAC: Reconfigure or Resume, Reconfigure SCG RLC: No action or Resume SCG MAC: No action or Resume, Reconfigure | PDCP: Re-establish MCG RLC: Establish or Resume MCG MAC: Reconfigure or Resume, Reconfigure SCG RLC: See Note 1 or Resume SCG MAC: See Note 1 or Resume, Reconfigure | N/A | PDCP: Re-establish MCG RLC: No action MCG MAC: No action SCG RLC: See Note 1 SCG MAC: See Note 1 | PDCP: Reconfigure MCG RLC: Note 5 MCG MAC: Note 5 SCG RLC: Establish or Resume SCG MAC: Establish or Resume, Reconfigure | PDCP: Re-establish MCG RLC: Note 5 MCG MAC: Note 5 SCG RLC: Establish or Resume SCG MAC: Establish or Resume, Reconfigure |
| Triple Split | PDCP: Recovery MCG RLC: No action MCG MAC: No action SCG RLC: Note 6 SCG MAC: Note 6 | PDCP: Re-establish + Recovery MCG RLC: See Note 5 MCG MAC: See Note 5 SCG RLC: Note 6 SCG MAC: Note 6 | PDCP: Reconfigure + Recovery MCG RLC: See Note 5 MCG MAC: See Note 5 SCG RLC: Note 6 SCG MAC: Note 6/Release or suspend | PDCP: Re-establish + Recovery MCG RLC: See Note 5 MCG MAC: See Note 5 SCG RLC: Note 6 SCG MAC: Note 6/Release or suspend | PDCP: Reconfigure + Recovery MCG RLC: See Note 5 MCG MAC: See Note 5 SCG RLC: Note 6 SCG MAC: Note 6/Release or suspend | PDCP: Re-establish + Recovery MCG RLC: See Note 5 MCG MAC: See Note 5 SCG RLC: Note 6 SCG MAC: Note 6/Release or suspend | N/A | PDCP: Re-establish MCG RLC: See Note 5 MCG MAC: See Note 5 SCG RLC: Note 6 SCG MAC: Note 6/ Release or suspend |

The note 5 in above table 1 is for a bearer combination that includes the MCG bearer. If MCG bearer is being configured/activated for the first time, then the UE (100) performs the establishment procedure. If the MCG bearer is active, then either no action, suspend procedure or Note 1 as specified in TS 37.340 (Annex A—Layer 2 handling for bearer type change). If the MCG bearer is not active, then the UE (100) performs either reestablishment or resumes from the suspended state. If the request is to release bearer, then the UE (100) releases the bearer.

The note 6 in above table 1 is for a bearer combination that includes the SCG bearer. If the SCG bearer is being configured/activated for the first time, then the UE (100) performs the establishment procedure. If the SCG bearer is active, then the UE (100) performs either no action or suspends the bearer. If the SCG bearer is not active, then the UE (100) performs either (re-)establishment or resumes from the suspended state. If the request is to release bearer, then the UE (100) releases the bearer.

The disclosed method specifies the procedure for suspending, resuming of the radio bearers at the lower layers. The disclosed method may be extended to all the bearer types.

Suspend/Resume the bearer by RRC configuration: The network node sends the RRC message like the RRC suspend or any other existing message to the UE (100) for suspending the bearer. The message for suspending the bearer includes the bearer ID which need to be suspend and also mention the secondary node like MCG, SCG1, SCG2 optionally for which bearer e.g. RLC/MAC need to be suspended. This message can be sent by the MN or any of the secondary nodes. The other possible way is to send the suspend command through a RRC release message. The RRC release message can be applicable to specific nodes for which bearer need to be suspended.

RRC Release: The RRC release with suspend indicates the leg or access node (accessValue) of the DRBs to be suspended especially in case of triple split bearer, which can be extended to other bearers as well. Table 2 shows an example of related configuration information.

TABLE 2

```
SuspendConfig ::=    SEQUENCE {
accessToBeSuspended    access Value,
fullI-RNTI    I-RNTI-Value,
shortI-RNTI    ShortI-RNTI-Value,
ran-PagingCycle    PagingCycle,
ran-NotificationAreaInfo    OPTIONAL, -- Need M
t380    PeriodicRNAU-TimerValue    OPTIONAL, -- Need R
nextHopChainingCount    ,
. . .
}
```

TABLE 2-continued

```
access Value ::= ENUMERATED {primary/master node, secondary
(-primary) node, secondary node} -> Which node is primary and
secondary is up to the network
```

The accessValue can be enumerated as {primary/master node, secondary (–primary) node, secondary node}, in which the network decides the primary and secondary nodes. Based on the accessValue received to the MN node, the MN node indicates and sends the suspend request and configuration to the corresponding node. The PDCP layer sends the message to suspend the bearer configuration to a particular leg of the DRBs. Accordingly, the RLC and MAC layers suspend the bearer configuration, to be resumed only upon receiving the request for the same. It is up to the network if the request can be sent via MN or SN nodes. The MN should be aware of these changes in configuration. Table 3 shows an example of related configuration information.

TABLE 3

```
RRC Resume:
RRCResume-v1610-IEs ::=             SEQUENCE {
NAccessToResume             INTEGER    OPTIONAL,
accessTo Resume                 accessValue,
restoreSCG-r16              ENUMERATED {true)
   mrdc-SecondaryCellGroup-r16         CHOICE {
      nr-SCG-r16              OCTET STRING (CONTAINING RRCReconfiguration),
      eutra-SCG-r16           OCTET STRING
accessToResume                  accessValue, //to include next access to be resumed
   . .
   }
accessValue ::=    ENUMERATED {primary/master node, secondary (-primary)
node, secondary node} -> Which node is primary and secondary is up to the
network.
```

When the RRC resume receives at the UE (100), and if the third RAT or leg is not specified to be activated, which indicates that one of the RAT/leg continues to remain in suspended state or is released. When the third RAT or leg is not specified to be activated, which indicates that the access node need to be resumed in the RRC Resume approach or follow the MAC CE approach as well (similar to RRC release with suspend case). In case more than one RAT has to be suspended or resumed, then either a count of number of access the request (NAccessToSuspend/NAccessToRe-sume) is received can be included in the message itself or keep adding access information one after the other, to be identified by parsing until end of message is received. This count may be made optional e.g. may be included only if more than one access information is present in the message. Either option may be used, based on the implementation.

In an embodiment, new messages can be added carrying relevant information of the suspend/resume configuration e.g. RRCBearerSuspend, RRCBearerResume. Table 4 shows an example of related configuration information.

TABLE 4

```
RRCBearerSuspend-v18-IEs ::=            SEQUENCE {
SuspendConfig ::=                    SEQUENCE {
NAccessToSuspend    INTEGER             OPTIONAL,
accessToSuspend                     accessValue,
fullI-RNTI    I-RNTI-Value,
shortI-RNTI      ShortI-RNTI-Value,
   ran-PagingCyclePagingCycle,
   ran-NotificationAreaInfo            OPTIONAL, -- Need M
   t380    PeriodicRNAU-Timer Value            OPTIONAL, -- Need R
nextHopChainingCountNextHopChainingCount,
   . . .
accessToSuspend                     accessValue, //to include next access to be suspended
   }
   }
RRCBearerResume-v18-IEs ::=             SEQUENCE {
NAccessToResume    INTEGER     OPTIONAL,
accessToResume                      accessValue,
   restoreSCG-r16                   ENUMERATED { true}
   mrdc-SecondaryCellGroup-r16          CHOICE {
```

TABLE 4-continued

| nr-SCG-r16 | OCTET STRING (CONTAINING RRCReconfiguration), |
| eutra-SCG-r16 | OCTET STRING |
| accessToResume | accessValue, //to include next access to be resumed |
| . . | |
| } | |

Newly added repeated IEs NAccessToResume, accessToResume, NAccessToSuspend, accessToSuspend definition remains same in this entire method.

Figure 6A:
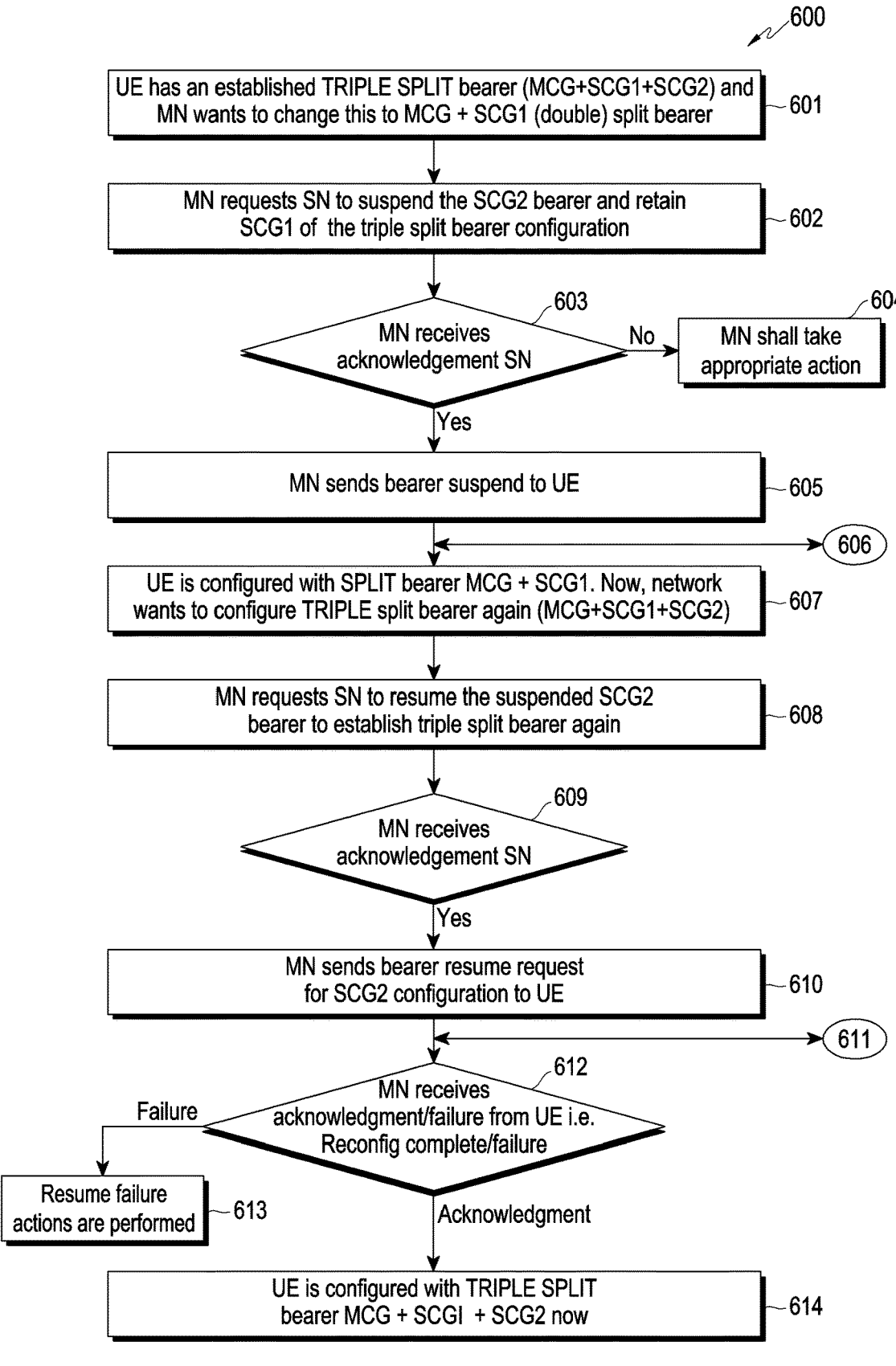
FIGS. 6A and 6B are a flowchart illustrating an example method for handling the bearer type change or the update of the bearer configuration at the UE and the network nodes through the RRC layer or layer 3 based triggered mechanism, according to various embodiments.
Figure 6B:
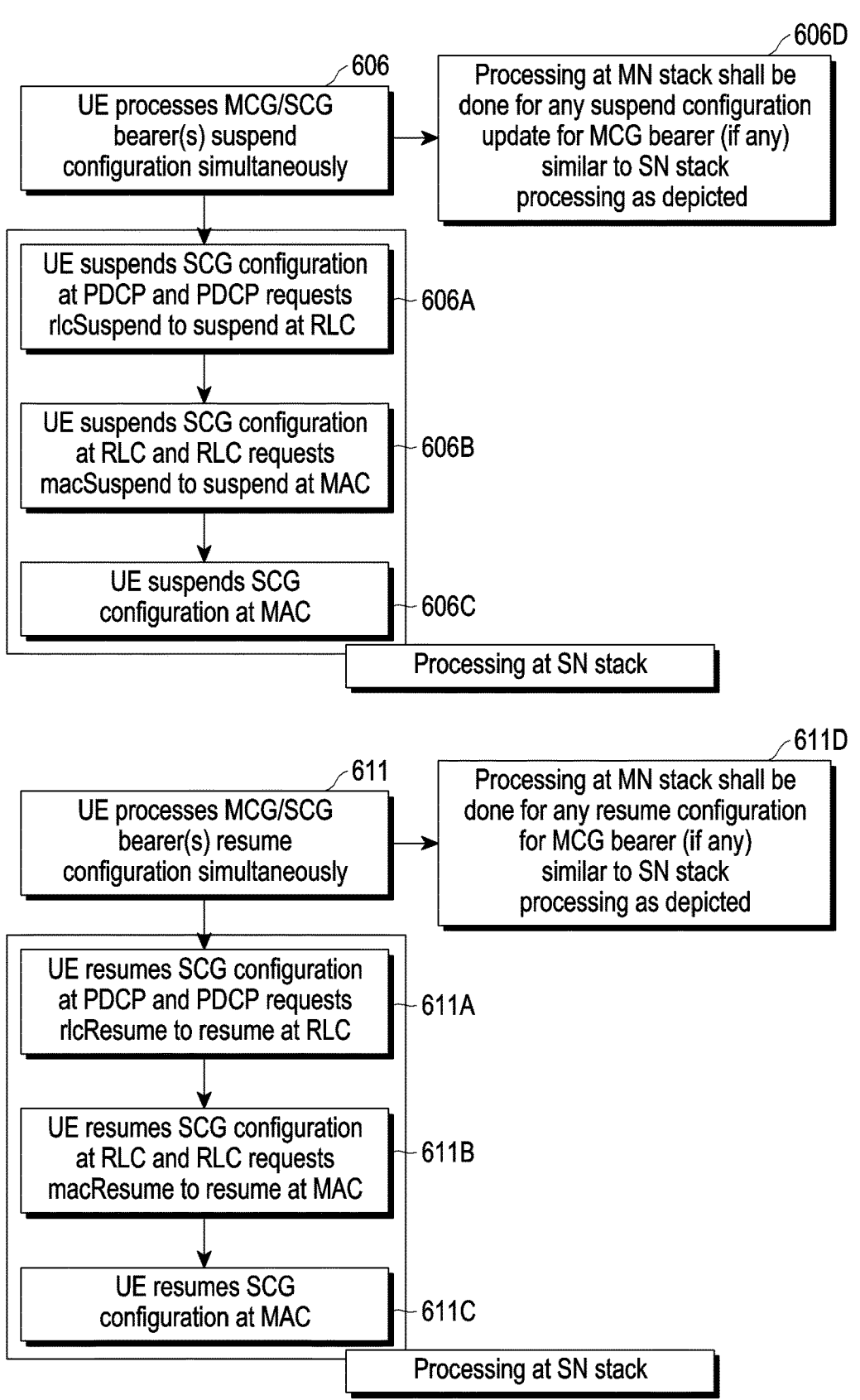

FIGS. 6A and 6B is a flowchart (600) illustrating an example method for handling the bearer type change or the update of the bearer configuration at the UE (100) and the network nodes through the RRC layer or layer 3 based triggered mechanism, according to various embodiments. At 601, the UE (100) has an established triple split bearer (MCG+SCG1+SCG2) and the MN wants to change established triple split bearer (MCG+SCG1+SCG2) to a double split bearer (MCG+SCG1). At 602, the MN requests the SN to suspend the SCG2 bearer and retain the SCG1 bearer of the triple split bearer configuration. At 603, the MN checks whether the MN has received an acknowledgement from the SN. At 604, when the MN has not received the acknowledgement from the SN, then the MN may take appropriate action. At 605, when the MN has received the acknowledgement from the SN, then the MN sends a bearer suspend request to the UE (100).

At 606, the UE (100) processes the MCG/SCG bearer(s) suspend configuration simultaneously by performing operations 606A-606C. At 606A, the UE (100) suspends the SCG configuration at the PDCP (160) and the PDCP (160) requests rlcSuspend to suspend at the RLC (170). At 606B, the UE (100) suspends the SCG configuration at the RLC (170) and the RLC (170) requests the macSuspend to suspend at the MAC (180). At 606C, the UE (100) suspends the SCG configuration at the MAC (180). Operations 606A-606C illustrate a procedure of processing at the SN stack. At 606D, processing at the MN stack may be done for any suspend configuration update for the MCG bearer (if any) similar to the SN stack processing as depicted. At 607, the UE (100) is configured with the split bearer MCG+SCG1. Now, the network wants to configure triple split bearer again (MCG+SCG1+SCG2). At 608, the MN requests the SN to resume the suspended the SCG2 bearer to establish the triple split bearer again. At 609, the MN receives an acknowledgement from the SN. At 610, the MN sends the bearer resume request for the SCG2 configuration to the UE (100).

At 611, the UE (100) processes the MCG/SCG bearer(s) resume configuration simultaneously by performing operations 611A-611C. At 611A, the UE (100) resumes the SCG configuration at the PDCP (160) and the PDCP (160) requests rlcResume to resume at the RLC (170). At 611B, the UE (100) resumes the SCG configuration at the RLC (170) and the RLC (170) requests the macResume to resume at the MAC (180). At 611C, the UE (100) resumes the SCG configuration at the MAC (180). Operations 611A-611C illustrate a procedure of processing at the SN stack. At 611D, processing at the MN stack may be done for any resume configuration update for the MCG bearer (if any) similar to the SN stack processing as depicted. At 607, the UE (100) is configured with the split bearer MCG+SCG1. Now, the network wants to configure triple split bearer again (MCG+SCG1+SCG2). At 608, the MN requests the SN to resume the suspended the SCG2 bearer to establish the triple split bearer again. At 612, the MN receives the acknowledgment/ failure (Reconfig complete/failure) from the UE (100). At 613, the UE (100) resumes failure actions. At 614, the UE (100) is configured with triple split bearer MCG+SCG1+SCG2 now.

It is clear from the flowchart (600) that the suspend/resume mechanism works faster compared to the traditional approach. The suspend scenario does not require any acknowledgment. Messages may be added (similar to request messages for ex: macAck, rlcAck etc.) or at least the acknowledgement can be sent by each layer to the layer from which the suspend request is received optionally. The resume scenario may also be handled in similar fashion. However, in case of resume failure it is better to indicate the failure to the network so that actions performed in the resume failure case in the existing flow are executed here.

Figure 7:
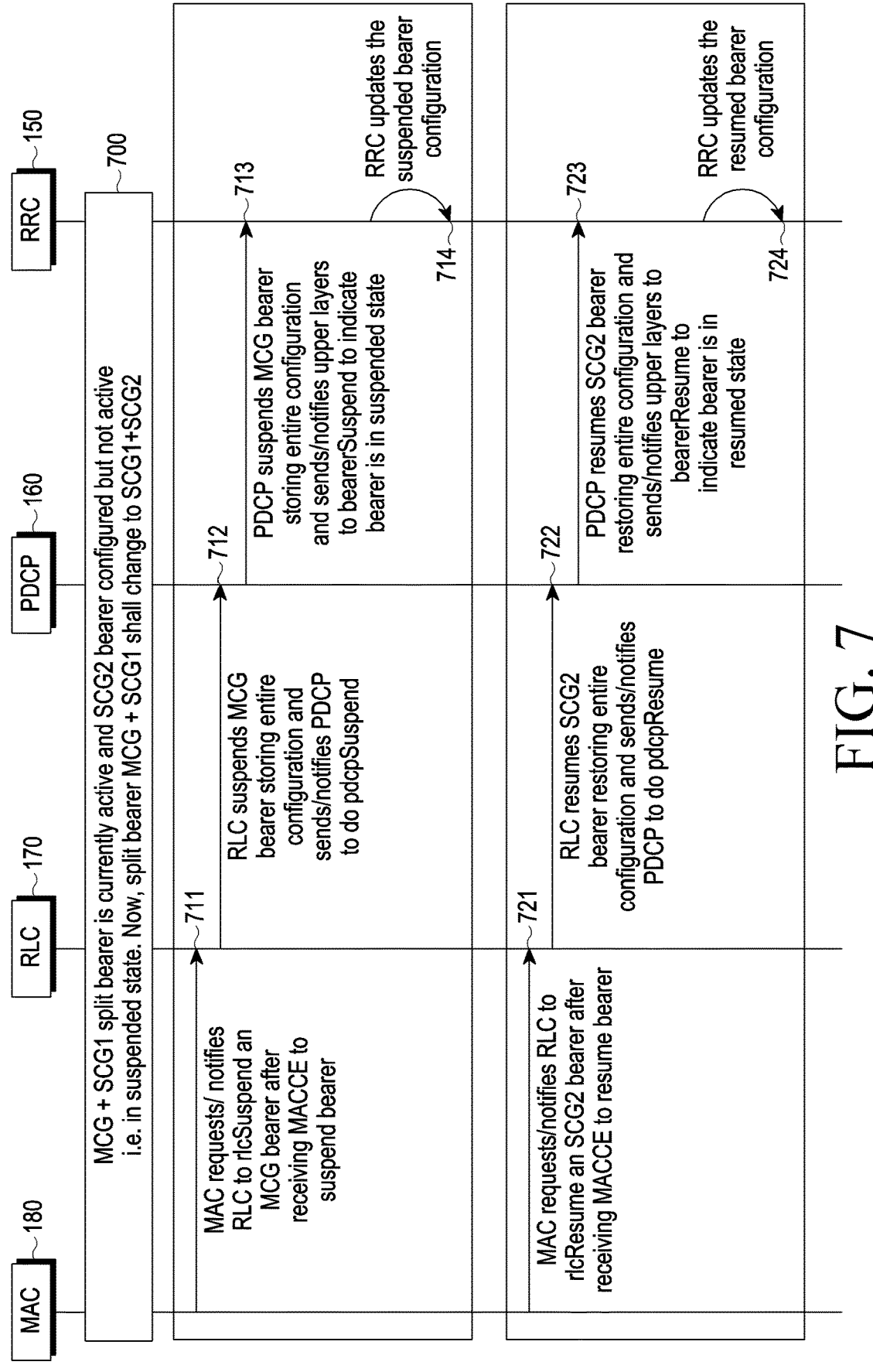
FIG. 7 is a signal flow diagram illustrating example signaling between the RRC layer, the PDCP layer, the RLC layer, and the MAC layer for handling the bearer type change or the update of the bearer configuration through a MAC layer or PHY layer or layer 2 based triggered mechanism, according to various embodiments.

FIG. 7 is a signal flow diagram illustrating example signalling between the RRC layer, the PDCP layer, the RLC layer, and the MAC layer for handling the bearer type change or the update of the bearer configuration through the MAC layer or a PHY layer or a layer 2 based triggered mechanism, according to various embodiments. At 700, consider the MCG+SCG1 split bearer is currently active and the SCG2 bearer is configured but not active e.g. in suspended state. For changing the split bearer MCG+SCG1 to SCG1+SCG2, the UE (100) performs operations 711-714 to suspend the MCG bearer, and operations 721-724 to resume the SCG2 bearer. At 711, the MAC (180) requests/notifies a rlcSuspend message to the RLC (170) to suspend the MCG bearer after receiving the MAC CE. At 712, the RLC (170) suspends the MCG bearer, stores the MCG bearer configuration and sends/notifies a pdcpSuspend message to the PDCP (160). At 713, the PDCP (160) suspends the MCG bearer, stores the MCG bearer configuration and sends/notifies a bearerSuspend message to the RRC (150) to indicate the bearer is in suspended state. At 714, the RRC (150) updates the suspended bearer configuration.

At 721, the MAC (180) requests/notifies a rlcResume message to the RLC (170) to resume the SCG2 bearer after receiving the MAC CE. At 722, the RLC (170) resumes the SCG2 bearer, restores the SCG2 bearer configuration and sends/notifies a pdcpResume message to the PDCP (160). At 723, the PDCP (160) resumes the SCG2 bearer, restores the SCG2 bearer configuration and sends/notifies a bearerResume message to the RRC (150) to indicate the bearer is in resumed state. At 724, the RRC (150) updates the resumed bearer configuration.

FIG. 8 is a flowchart (800) illustrating an example method for handling the bearer type change or the update of the bearer configuration at the UE (100) and the network nodes through the MAC layer or the PHY layer or the layer 2 based triggered mechanism, according to various embodiments. At 801, the UE (100) has an established triple split bearer (MCG+SCG1+SCG2) and the bearer type has to change to double split bearer (MCG+SCG1). At 802, the MN sends the suspend MAC CE to UE to suspend SCG2 of the triple split bearer. At 803, the MAC (180) of the UE (100) suspends the requested bearer configuration and indicates RLC (170) to suspend the corresponding bearer. At 804, the RLC (170) of the UE (100) suspends the requested bearer configuration and indicates the PDCP (160) to suspend the corresponding bearer. At 805, the PDCP (160) suspends the requested bearer configuration and notifies the bearer suspend to the RRC (150) to suspend the corresponding bearer. At 806, the UE (100) is now configured with the MCG+SCG1 split bearer. Again, the bearer type is changed to triple split bearer. At 807, the UE (100) the MN sends the resume MAC CE to the UE (100) to resume the SCG2 of the triple split bearer. At 808, the MAC (180) resumes the suspended bearer configuration and indicates the RLC (170) to resume the corresponding bearer. At 809, the RLC (170) resumes the suspended bearer configuration and indicates the PDCP (160) to resume the corresponding bearer, At 810, the PDCP (160) resumes the suspended bearer configuration and notifies the RRC (150) to resume the corresponding bearer, At 811, the UE (100) is now configured with MCG+SCG1+SCG2 triple split bearer.

Considering the disclosed method, when Distributed Unit (DU) performs suspend/resume then it should notify the bearer suspended/resumed to the upper layers to maintain synchronization. Upon completion of suspend/resume of a bearer(s), the RRC (150) may be notified about the suspend/resume of a bearer(s) via either RRCBearerSuspendNotify/RRCBearerResumeNotify IE (refer below for detailed IE) using the same RRCBearerSuspend/RRCBearerResume discussed in RRC based approach or existing RRC Suspend/Resume procedures. Table 5 shows an example of related configuration information.

to resume, then PDCP entity (160) indicates the RLC (170) to resume one or more suspended RLC bearers, and includes re-establishment (re-est) to true in case of PDCP key change otherwise set to FALSE or do not include this field in the message.

PDCP entity pdcpSuspend message: During bearer type change or when the PDCP entity (160) receives the request from lower layers to suspend, then the PDCP entity (160) suspends the requested bearer configuration, discards all stored PDCP SDUs received from the bearers to be suspended or perform PDCP data recovery at transmitting side, and delivers all stored PDCP SDUs to the upper layers at receiving side.

PDCP entity pdcpResume message: During bearer type change or when upper layers' request PDCP entity to resume, then the PDCP entity (160) suspends the requested bearer configuration, and includes the re-establishment (re-est) to true in case of PDCP key change otherwise set to false or do not include this field in the message.

PDCP entity bearerSuspend message: Upon receiving pdcpSuspend request from lower layers, after suspending the PDCP (160) notifies the upper layers about the suspended bearer.

PDCP entity bearerResume message: Upon receiving the pdcpResume request from the lower layers, after resuming the PDCP (160) notifies the upper layers about the suspended bearer.

Changes with respect to RLC specification 38.322, 4.4 Functions include requesting the RLC (170) to suspend/

TABLE 5

```
RRCBearerSuspendNotify-v18-IEs ::=        SEQUENCE {
SuspendNotifyConfig ::=                   SEQUENCE {
NAccessToSuspend    INTEGER               OPTIONAL,
accessToSuspend                           accessValue,
radioBearerConfigRadioBearerConfig,
    }
}
RRCBearerResume-v18-IEs ::= SEQUENCE {
NAccessToResume      INTEGER              OPTIONAL,
accessToResume                            accessValue,
radioBearerConfigRadioBearerConfig,
    restoreSCG-r16           ENUMERATED {true}
    mrdc-SecondaryCellGroup-r16    CHOICE {
      nr-SCG-r16             OCTET STRING (CONTAINING RRCReconfiguration),
      eutra-SCG-r16          OCTET STRING
accessToResume                            access Value, //to include next access to be resumed
    . .
    }
```

Changes with respect to PDCP specification TS 38.323: In the TS 38.323 under 4.4 Functions include requesting the RLC (170) to suspend/resume RLC bearer in multi-tier deployment or multi-DC, and the receiving the request at the PDCP (160) to suspend/resume radio bearer in multi-tier deployment or multi-DC. To receive and transmit suspend/resume of radio bearer configuration, following messages are added under Procedures section in the specification.

PDCP entity rlcSuspend message: During the bearer type change or when the PDCP entity (160) receives request from upper layers to suspend, then the PDCP entity (160) indicates the RLC (170) to suspend one or more activated RLC bearers to maintain bearer's context at the RLC (170), discards all stored PDCP SDUs received from the bearers to be suspended or perform PDCP data recovery at transmitting side, delivers all stored PDCP SDUs to the upper layers at receiving side.

PDCP entity rlcResume message: During bearer type change or when upper layers' request the PDCP entity (160)

resume corresponding MAC bearer in multi-tier deployment or multi-DC, and receiving the request at the RLC (160) to suspend/resume radio bearer in multi-tier deployment or multi-DC. To receive and transmit suspend/resume of radio bearer configuration, below messages are added under Procedures section in the specification.

RLC entity rlcSuspend message: When the upper layers request the RLC (170) to suspend one or more activated RLC bearers to maintain bearer's context at the RLC (170), then the RLC (170) discards all stored RLC SDUs (complete or segments), RLC PDUs if any received from the bearers to transmitting side, delivers all stored RLC SDUs (complete or segments), RLC PDUs if any to the upper layers at receiving side, stops all timers, resets all state variables to their initial values;

RLC entity rlcResume message: When the upper layers request the RLC (170) to resume one or more suspended RLC bearers, then the RLC (170) includes the re-establishment (re-est) or re-est is set to true perform RLC reestablishment. If re-est is set to FALSE or not included, then the RLC (170) re-configures and reactivates the bearer with the suspended configuration, and follows the procedures at RLC.

RLC entity macSuspend message: When the upper layers request the RLC (170) to suspend, then the RLC entity (170) may request the MAC (180) to suspend the logical channel configuration for the requested bearer.

RLC entity macResume message: When upper layers request the RLC (170) to resume, then the RLC (170) entity may request the MAC to resume (with reset optionally) the logical channel configuration for the requested bearer.

RLC entity pdcpSuspend message: When lower layers (MAC (180)) request the RLC (170) to suspend, then the RLC (170) entity requests or notifies the PDCP (160) to suspend the bearer.

RLC entity pdcpResume message: When the lower layers (MAC (180)) request the RLC (170) to resume, then the RLC (170) requests or notifies the PDCP (160) to resume the bearer.

Changes with respect to MAC specification 38.321: Functions include requesting the RLC (170) to suspend/resume the radio bearer in multi-tier deployment or multi-DC, and receiving the request at MAC (180) to suspend/resume logical channel configuration mapped to a bearer in multi-tier deployment or multi-DC. To receive and transmit suspend/resume of radio bearer configuration, below messages are added under Procedures section in the specification.

Reception of macSuspend message: When the upper layers request the MAC (180) to suspend one or more activated MAC logical configuration of the bearer store the MAC configuration corresponding to the bearer.

Reception of macResume message: When the upper layers request the MAC (180) to resume one or more MAC configuration, then the MAC (180) includes the reset or reset is set to true perform MAC reset. If re-est is set to false or not included, then the MAC (180) re-configures and reactivates the suspended configuration.

Notification of rlcSuspend message: When the MAC (180) receives the request to suspend the bearer, then the MAC (180) requests or notifies the upper layers to suspend the bearer configuration.

Notification of rlcResume message: When the MAC (180) receives the request to resume the suspended bearer, then the MAC (180) requests or notifies the upper layers to resume the bearer configuration.

With the introduction new kind of the split bearer there is a need to indicate the support for the new kind of the split bearer in terms of PDCP duplication for activation of the PDCP duplication over all three nodes explicitly. Support of the PDCP duplication over the triple split bearer is indicated as part of a UE capability IE: PDCP-ParametersMRDC. Based on the indication, the triple split bearer may either be configured or not. In RRC specification 38.331 below IE may be modified to indicate the duplication split over three split bearer. The UE capability information elements—PDCP-ParametersMRDC is exemplified in the following [Table 6]:

TABLE 6

```
6.3.3 UE capability information elements - PDCP-ParametersMRDC
    ::=    SEQUENCE {
    pdcp-DuplicationSplitSRB    ENUMERATED {supported}    OPTIONAL,
    pdcp-DuplicationSplitDRB    ENUMERATED {supported}    OPTIONAL
    pdcp-DuplicationTripleSplitSRB ENUMERATED {supported}    OPTIONAL,
    pdcp-DuplicationTripleSplitDRB ENUMERATED {supported}    OPTIONAL.
```

There is a requirement to indicate the triple split threshold value at UL when three bearers are configured in multi-DC deployment. Support of UL triple Split threshold may be indicated as part of PDCP configuration. There are three approaches disclosed to indicate the split threshold.

Approach 1: Add another field tripleSplitSecondaryPath in existing moreThanTwoRLC-DRB-r16 of PDCP Config IE to indicate the third bearer existence and correspondingly supported data threshold. This can be an optional field e.g. included when triple split bearer or when three or more than three bearers are split configured. Below is the modified IE to indicate split supported between three bearers. Table 7 shows an example of related configuration information.

TABLE 7

```
6.3.2 PDCP Config
    moreThanTwoRLC-DRB-r16 SEQUENCE {
        splitSecondaryPath LogicalChannelIdentity    OPTIONAL, -- Cond
SplitBearer2
        tripleSplitSecondaryPath LogicalChannelIdentity    OPTIONAL,
-- Cond SplitBearerN
        duplicationState SEQUENCE (SIZE (3)) OF BOOLEAN OPTIONAL
-- Need S
    }
ul-DataTripleSplitThreshold    UL-DataTripleSplitThreshold
OPTIONAL, -- Cond SplitBearerN.
```

TripleSplitBearer/multiSplitBearer: The field is mandatory present, in case of three or more split bearers. Otherwise the field is absent.

tripleSplitSecondaryPath: Indicates the LCID of the next split secondary RLC entity as specified in technical specification 38.323 [5] for fall back to split bearer operation when UL data transmission with more than two RLC entities is associated with the PDCP entity. This RLC entity belongs to a cell group that is different from the cell group indicated by cellGroup in the field primaryPath. It is upto implementation to use third node for data threshold only once two nodes are fully utilized. The above definitions remain same for all the mentioned approaches.

Approach 2: a new IE moreThanThreeRLC-DRB-r18 or moreThanNRLC-DRB-r18 can be introduced indicating the tripleSplitSecondaryPath or NSplitSecondaryPath. When this IE is present a UL split may occur between three or more than three nodes. Otherwise split is between only two nodes. This way the existing IE may remain unchanged and configuration for double split and triple or multi split can be used when respective type of bearers is configured or activated to use. Table 8 shows an example of related configuration information.

TABLE 8

```
6.3.2 PDCP Config-
moreThanTwoRLC-DRB-r16 SEQUENCE {
        splitSecondaryPathLogicalChannelIdentity    OPTIONAL, -- Cond
SplitBearer2
        duplicationState    SEQUENCE    (SIZE (3))    OF    BOOLEAN
OPTIONAL -- Need S
```

TABLE 8-continued

```
}
  moreThanThreeRLC-DRB-r18/ moreThanThreeRLC-DRB-r18
  SEQUENCE {
    tripleSplitSecondaryPath    LogicalChannelIdentity
OPTIONAL, -- Cond NSplitBearer
    duplicationState  SEQUENCE  (SIZE  (3))  OF  BOOLEAN
OPTIONAL -- Need S
  }
ul-DataTripleSplitThreshold UL-DataTripleSplitThreshold    OPTIONAL,
-- Cond NSplitBearer.
```

Approach 3: splitSecondaryPath may be set to a cumulative value of the split threshold across all secondary nodes (2 or more). Additional IE as moreThanTwoSNRLC-DRB-r18/moreThanNSNRLC-DRB-r18 may be added to indicate the split between the two secondary nodes. When this IE is present a UL split may occur between three nodes. Otherwise split is between only two nodes. This way the existing IE may remain unchanged and configuration for double split and triple can be used when respective type of bearers is configured or activated to use. Additionally, providing the split threshold between the secondary nodes only. Table 9 shows an example of related configuration information.

TABLE 9

```
6.3.2 PDCP Config-
moreThanTwoRLC-DRB-r16 SEQUENCE {
    splitSecondaryPathLogicalChannelIdentity       OPTIONAL, -- Cond
SplitBearer2
    duplicationState   SEQUENCE  (SIZE  (3))  OF  BOOLEAN
OPTIONAL -- Need S
  }
    moreThanTwoSNRLC-DRB-r16/ moreThanNRLC-DRB-r16 SEQUENCE {
    tripleSplitSecondaryPath/splitSecondaryPathLogicalChannelIdentity
    OPTIONAL, -- Cond NSplitBearer
    duplicationState   SEQUENCE  (SIZE  (3))  OF  BOOLEAN
OPTIONAL -- Need S
  }
  ul-DataTripleSplitThreshold    UL-DataTripleSplitThreshold
OPTIONAL, -- Cond NSplitBearer
```

Figure 9:
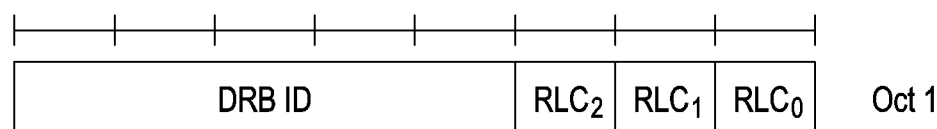
FIG. 9 is a diagram illustrating an example MAC control element, according to various embodiments.

FIG. 9 is a diagram illustrating an example structure of a disclosed MAC control element, according to various embodiments. Suspend/resume a particular bearer(s) by MAC: Another method is network sends the new MAC CE including the DRB ID and the LCID index to index the suspension of bearer of particular leg/access nodes. New LCID "Suspend-Resume for LCID" at index 46 from the reserved index has to be added for the same (refer Table 6.2.1-1 values of LCID for DL-SCH).

When the MAC (180) receives the CE, the MAC (180) indicates to the RLC (170) and the RLC (170) indicates the same to the PDCP (160) to suspend the configuration. This CE can be sent directly to the MN MAC or individually to the access node (primary or non-primary MAC). In case, the CE is sent to a non-primary MAC, then MN should be informed to be aware of the configuration changes. The below table 10 shows the values of LCID for DL-SCH.

TABLE 10

| Codepoint/Index | LCID values |
|---|---|
| 0 | CCCH |
| 1-32 | Identity of the logical channel |
| 33 | Extended logical channel ID field (two-octet eLCID field) |
| 34 | Extended logical channel ID field (one-octet |

TABLE 10-continued

| Codepoint/Index | LCID values |
|---|---|
| | eLCID field) |
| 35-45 | Reserved |
| 46 | Suspend-Resume for LCID |
| 47 | Recommended bit rate |

FIG. 10 is a diagram illustrating example structures of data Protocol Data Units (PDUs), according to various embodiments. The PDCP SN size has increased in NR compared to LTE to fully utilize the additional resources. Though there is additional node added in multi-DC, it is difficult to realize if correspondingly SN limit is not increased at PDCP, RLC layers respectively. To fully benefit from multi-DC in terms of throughput and speed, need to support higher number of data packets. Below additions are required in PDCP TS 38.323 as given in table 11.

TABLE 11

| Length | Description |
|---|---|
| 12 | UM DRBs, AM DRBs, and SRBs (including sidelink DRBs and sidelink SRBs) |
| 18 | UM DRBs, and AM DRBs and SRBs (including sidelink DRBs for unicast) |
| 24 | UM DRBs, AM DRBs, and SRBs (including sidelink DRBs and sidelink SRBs) |
| 32 | UM DRBs, and AM DRBs (including sidelink DRBs for unicast) |

Referring to FIG. 10, reference number 101 shows data PDU with 24-bit PDCP SN. Reference number 102 shows data PDU for sidelink DRBs for unicast with 24-bit PDCP SN. Reference number 103 shows data PDU with 32-bit PDCP SN. Reference number 104 shows data PDU for sidelink DRBs for unicast with 32-bit PDCP SN. Reference number 105 shows data PDU for SRBs.

With the increase in number of bearers for data traffic, data volume is bound to increase. Each node would have data to report for BSR purposes. The PDCP reports SCG data volume in case of PDCP duplication and if pending data traffic for initial transmission is at least or greater than split threshold where 2 bearers are activated. Similarly, there is a need to report data volume for the new additional bearer to fetch grants. Below point highlighted in red may be added to PDCP standard specification TS 38.323. Table 12 shows an example of related configuration information.

TABLE 12

5.6 Data Volume Calculation
else (e.g. the PDCP duplication is deactivated for the RB or the RB is a DAPS bearer):
   - if the split secondary RLC entity is configured; and
   - if the total amount of PDCP data volume and RLC data volume pending for initial
transmission (as specified in TS 38.322 [5])
   - else if more than one non-primary RLC entity is configured; and
   - if the total amount of PDCP data volume and RLC data volume pending for
initial transmission (as specified in TS 38.322 [5])
    in the primary RLC entity and all the non-primary RLC entity is equal to or
larger than ul-DataSplitThreshold:
     - indicate the PDCP data volume to both the MAC entity associated with
the primary RLC entity and the MAC entity associated with
     the non-primary RLC entity;
     - indicate the PDCP data volume as 0 to the MAC entity associated with
RLC entity other than the primary RLC entity and all the non-primary RLC
entity with split bearer.

With the increase in different types of RATs (ex. LTE, NR, Wi-Fi, Terahertz, etc.) and UE's ability to support multiple RATs has its benefits. One of the benefits is to indicate a node (primary or secondary) has failed for its quick recovery to not interrupt the services provided to the UE (100). Similarly, there is a need to apply the same principle for multi-DC. Currently the IE related to this is defined for LTE or NR. With more RATs being supported at least for data traffic, the IEs should be made generic. Fast recovery mechanism is supported by the UE (100) currently to recover the failure access. The same principle needs to be extended and applied to multi-DC also. Though more than 2 nodes are supported in multi-DC, there is no surety which node is active at a given time. Table 13 shows an example of related configuration information.

TABLE 13

```
-   MCGFailureInformation
MCGFailureInformation-r16-IEs ::= SEQUENCE {
    failureReportMCG-r16   FailureReportMCG-r16       OPTIONAL,
    AccessType   ENUMERATED   {E-UTRA, OPTIONAL, NR,
    TeraHertz}
    OPTIONAL,
    SCGNodeID   SEQUENCE   MANDATORY,
    lateNonCriticalExtension   OCTET STRING   OPTIONAL,
    nonCriticalExtension   SEQUENCE { }   OPTIONAL
}
-   SNFailureInformation
SNFailureInformation ::=   SEQUENCE {
    criticalExtensions   CHOICE {
        NodeFailureInformation       NodeFailureInformation-IEs,
        AccessType ENUMERATED    {E-UTRA, NR, TeraHertz}
        OPTIONAL,
        SCGNodeID   SEQUENCE       MANDATORY,
        criticalExtensionsFuture       SEQUENCE { }
    }
}
```

The various embodiments disclosed herein can be implemented using at least one hardware device and performing network management functions to control the elements.

The foregoing description of the specific embodiments discloses the general nature of the embodiments herein which others can, by applying current knowledge, readily modify and/or adapt for various applications such specific embodiments without departing from the general concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of various example embodiments, those skilled in the art will recognize that the embodiments herein can be practiced with modification within the scope of the embodiments as described herein.

What is claimed is:

1. A method performed by a user equipment (UE) in a wireless communication system supporting multi radio access technology-multi connectivity (MR-MC), the method comprising:
   transmitting, to a network node, UE capability information including information indicating a support of at least one of a dual split bearer or a triple split bearer,
   receiving, by the UE, a bearer suspend message associated with the triple split bearer from the network node among a plurality of network nodes;
   in response to receiving the bearer suspend message, identifying configuration information on the triple split bearer; and
   suspending the triple split bearer,
   wherein the triple split bearer is configured with one master cell group (MCG) bearer and two secondary cell group (SCG) bearers, and
   wherein suspending the triple split bearer comprises suspending at least one bearer of the MCG bearer or the two SCG bearers.

2. The method of claim 1, the method further comprising:
   receiving a bearer resume message associated with the triple split bearer from the network node; and
   in response to receiving the bearer resume message, resuming the suspended triple split bearer using the identified configuration information on the triple split bearer.

3. The method of claim 1, wherein the triple split bearer is associated with a plurality of network layers, and
   wherein the plurality of network layers comprises a radio link control (RLC) layer, a medium access control (MAC) layer, a packet data convergence protocol (PDCP) layer, and a radio resource control (RRC) layer.

4. The method of claim 2, wherein the bearer suspend message and the bearer resume message are radio resource control (RRC) messages,
   wherein each of the RRC messages includes a bearer ID of the triple split bearer to be suspended or resumed, and
   wherein the network node is one of a master/primary node (MN), a secondary-primary node and, a secondary node.

5. The method of claim 1, wherein the bearer suspend message uses an existing RRC release message including a field to indicate a leg or an access node of the triple split bearer to be suspended.

6. The method of claim 2, wherein the bearer resume message uses an existing RRC resume message including a field to indicate a leg or an access node to be resumed, and
wherein based on any previously suspended access node not being included in the bearer resume message the bearer resume message indicates that the access node continues to remain in a suspended state or is released.

7. The method of claim 2, wherein the bearer suspend message includes information indicating the access node to be suspended, and
wherein the bearer resume message includes information indicating an access node to be resumed.

8. The method of claim 1, wherein suspending the triple split bearer, comprises:
suspending the triple split bearer from a RRC layer to a MAC layer.

9. The method of claim 2, wherein resuming the suspended bearer, comprises:
resuming the suspended bearer from a RRC layer to a MAC layer.

10. The method of claim 1, wherein the bearer suspend message includes a MAC control element, the MAC control element including a bearer ID and a logical channel ID (LCID) of the triple split bearer to be suspended.

11. The method of claim 1, wherein suspending the triple split bearer, comprises:
sending a notification to a RRC layer upon suspending bearer configurations of the triple split bearer; and
updating the suspended bearer configuration at the RRC layer.

12. The method of claim 2, wherein resuming the suspended triple split bearer, comprises:
sending a notification to a RRC layer upon resuming bearer configurations of the triple split bearer; and
updating the resumed triple split bearer configuration at the RRC layer.

13. A method performed by a base station in a wireless communication system supporting multi radio access technology-multi connectivity (MR-MC), the method comprising:
receiving, from a user equipment (UE) by the base station, UE capability information including information indicating a support of at least one of a dual split bearer and a triple split bearer;
configuring the triple split bearer for the UE through a plurality of network nodes, based on the UE capability information;
identifying a change of the triple split bearer configured for the UE; and
transmitting, to the UE, a bearer suspend message based on the change of the triple split bearer,
wherein the triple split bearer is configured with one master cell group (MCG) bearer and two secondary cell group (SCG) bearers, and
wherein at least one bearer of the MCG bearer or the two SCG bearers is suspended based on the bearer suspend message.

14. The method as claimed in claim 13, further comprising:
transmitting, to the UE, packet data convergence protocol (PDCP) configuration information including a threshold value of the triple split bearer for uplink in a PDCP configuration in case that at least three bearers are configured in the MR-MC.

15. The method as claimed in claim 13, wherein, for indicating a buffer status report (BSR), in case that more than one non-primary radio link control (RLC) entity is configured and a total amount of PDCP data volume and a RLC data volume pending for an initial transmission in a primary RLC entity and all non-primary RLC entity is equal to or greater than the threshold value of the triple split bearer, a PDCP layer indicates the PDCP data volume to both a medium access control (MAC) layer associated with the primary RLC entity and a MAC layer associated with the non-primary RLC entity, wherein the PDCP layer indicates the PDCP data volume as 0 to the MAC layer associated with the RLC entity other than the primary RLC entity and all the non-primary RLC entity with a split bearer.

16. The method as claimed in claim 15, wherein a PDCP sequence number (SN) of size 18 is updated with signaling radio bearers (SRBs) to handle an increased data volume, wherein the PDCP SN of size 24 is added for unacknowledged mode (UM) data radio bearers (DRBs), acknowledged mode (AM) DRBs, and the SRBs including sidelink DRBs, sidelink SRBs to handle the increased data volume, wherein the PDCP SN of size 32 is added for the UM DRBs, the AM DRBs including the sidelink DRBs for unicast to handle the increased data volume.

17. The method as claimed in claim 13, wherein the base station handles a quick recovery of at least one failed access node using one or more available access node.

18. A user equipment (UE) in a wireless communication system supporting multi radio access technology-multi connectivity (MR-MC), the UE comprising:
a transceiver;
one or more processors including processing circuitry; and
memory storing instructions that, when executed by the one or more processors individually or collectively, cause the UE to:
transmitting, to a network node, UE capability information including information indicating a support of at least one of a dual split bearer or a triple split bearer,
receive, via the transceiver, a bearer suspend message associated with the triple split bearer from a network node among a plurality of network nodes,
in response to receiving the bearer suspend message, identify configuration information on the triple split bearer, and
suspend the triple split bearer,
wherein the triple split bearer is configured with one master cell group (MCG) bearer and two secondary cell group (SCG) bearers, and
wherein the instructions, when executed by the one or more processors individually or collectively, cause the UE to suspend at least one bearer of the MCG bearer or the two SCG bearers.

19. A base station in a wireless communication system supporting multi radio access technology-multi connectivity (MR-MC), the base station comprising:
a transceiver; and
one or more processors including processing circuitry; and
memory storing instructions that, when executed by the one or more processors individually or collectively, cause the base station to:

receive, via the transceiver from a user equipment (UE), UE capability information including information indicating a support of at least one of a dual split bearer or a triple split bearer, configure the triple split bearer for the UE through a plurality of network nodes, based on the UE capability information, identify a change of the triple split bearer configured for the UE, and transmit, to the UE via the transceiver, a bearer suspend message based on the change of the triple split bearer, wherein the triple split bearer is configured with one master cell group (MCG) bearer and two secondary cell group (SCG) bearers, and wherein at least one bearer of the MCG bearer or the two SCG bearers is suspended based on the bearer suspend message.

\* \* \* \* \*